US007946783B2

(12) United States Patent
Gehrke

(10) Patent No.: US 7,946,783 B2
(45) Date of Patent: May 24, 2011

(54) ADJUSTMENT MECHANISM AND LOCKING ASSEMBLY

(75) Inventor: Jon C. Gehrke, Clive, IA (US)

(73) Assignee: Innovative Ellavations, LLC, Clive, IA (US)

( * ) Notice: Subject to any disclaimer, the term of this patent is extended or adjusted under 35 U.S.C. 154(b) by 0 days.

(21) Appl. No.: 12/785,638

(22) Filed: May 24, 2010

(65) Prior Publication Data

US 2010/0229673 A1 Sep. 16, 2010

Related U.S. Application Data

(63) Continuation of application No. 12/115,981, filed on May 6, 2008, now Pat. No. 7,753,610, which is a continuation-in-part of application No. 11/181,263, filed on Jul. 14, 2005, now Pat. No. 7,381,172, which is a continuation-in-part of application No. 10/001,125, filed on Oct. 19, 2001, now Pat. No. 6,935,992.

(51) Int. Cl.
*F16B 7/10* (2006.01)

(52) U.S. Cl. .................................. 403/109.3; 403/109.8

(58) Field of Classification Search .............. 5/648–651, 5/657; 482/146, 100, 907, 908, 79; 292/32, 292/33, 38, 41; 403/109.1, 109.2, 109.3, 403/109.7, 109.8; 135/68, 69
See application file for complete search history.

(56) References Cited

U.S. PATENT DOCUMENTS

| | | | |
|---|---|---|---|
| 830,776 | A | 9/1906 | Flagg |
| 1,452,915 | A | 4/1923 | Kennedy |
| 1,619,685 | A | 3/1927 | Updegrove |
| 2,172,047 | A | 9/1939 | Jacobucci |
| 2,581,110 | A | 1/1952 | Kenworthy |
| 3,066,322 | A | 12/1962 | Derby |
| 3,957,041 | A | 5/1976 | Wilder |
| 4,071,031 | A | 1/1978 | Lowman |
| 4,432,108 | A | 2/1984 | Chapman |
| 4,692,954 | A | 9/1987 | Scott, Sr. |
| D296,932 | S | 7/1988 | Tranghese |
| 4,901,385 | A | 2/1990 | Adolphson |
| 4,979,533 | A | 12/1990 | Hansen et al. |
| 5,046,487 | A | 9/1991 | Scott |
| 5,065,488 | A | 11/1991 | Chapman |
| 5,402,811 | A | 4/1995 | Weng |
| 5,443,532 | A | 8/1995 | Hudak |
| 5,466,023 | A | 11/1995 | Williamson |
| 5,584,303 | A | 12/1996 | Walle |
| 5,725,486 | A | 3/1998 | Engelman |
| 5,765,416 | A | 6/1998 | Cote |
| D410,743 | S | 6/1999 | Mekjian |
| 5,954,621 | A | 9/1999 | Joutras et al. |
| D424,698 | S | 5/2000 | Ames |
| 6,314,977 | B1 | 11/2001 | Obitts et al. |
| 6,935,992 | B2 | 8/2005 | Gehrke |
| 7,381,172 | B1 | 6/2008 | Gehrke |

*Primary Examiner* — Robert G Santos
*Assistant Examiner* — Nicholas Polito
(74) *Attorney, Agent, or Firm* — Lathrop & Clark LLP

(57) ABSTRACT

An adjustment mechanism is provided. The adjustment mechanism has a housing, a clearance portion, first and second pin members telescopically received within the housing, a telescopic engagement mechanism mounted in the clearance portion and adapted to telescopically move the pin members, and a locking mechanism adapted to lock the pin members in a rigid position. A locking adjustment assembly is also provided.

19 Claims, 18 Drawing Sheets

ADJUSTMENT MECHANISM AND LOCKING ASSEMBLY

CROSS-REFERENCE TO RELATED APPLICATIONS

This application is continuation of U.S. application Ser. No. 12/115,981 filed May 6, 2008 now U.S. Pat. No. 7,753,610 entitled APPENDAGE ELEVATION SYSTEM, ADJUSTMENT MECHANISM AND METHOD OF USE, which is a continuation-in-part of U.S. application Ser. No. 11/181,263, filed Jul. 14, 2005, now U.S. Pat. No. 7,381,172 entitled LEG ELEVATOR SYSTEM, which is a continuation-in-part of U.S. application Ser. No. 10/001,125, filed Oct. 19, 2001, now U.S. Pat. No. 6,935,992 entitled LEG ELEVATOR SYSTEM, the contents of each of which are hereby incorporated in their entirety by reference.

BACKGROUND OF THE INVENTION

The present invention relates to devices used in supporting and elevating the lower extremities. More specifically, the invention is a leg elevator that provides three different calibrated adjustment mechanisms that operate independently of each other. First, the height of the leg elevator can be adjusted to vary the elevation of the extremities. Second, the angle of the relative portions of the leg elevator can be adjusted to a position that corresponds with a patient's knee or hip joint. Third, the leg elevator can be adjusted to accommodate people having a shorter or longer distance between the hip and the knee joint.

After surgery or injuries to the legs or feet, there is a need to elevate the lower extremities to aid in the healing process. Elevation is beneficial to recovery because it reduces or eliminates swelling and fluid build-up (edema). In addition, patients with chronic swelling or lymphoedema may benefit from leg elevation on a permanent basis. Finally, patients suffering from low back pain often benefit from lower leg elevation. Elevation is usually provided in the hospital-setting and is often recommended to patients upon discharge from the hospital. However, the devices currently in use do not satisfactorily meet the need for a leg elevator that is adjustable by three different and independent means and that is practical and effective for use both at home and at the hospital.

There are several devices in the art that are used to support the lower legs. One type of support variation is the foam leg support used in the devices depicted in U.S. Pat. No. 5,046,487 and in U.S. Design Pat. No. 424,698. While these supports are usually inexpensive and can be used in the home setting, the supports are generally not adjustable, thereby limiting the therapeutic value to some patients. In addition, foam devices cannot usually be easily disassembled or collapsed for transport or storage and generally cannot be easily disinfected.

There are also some adjustable leg supports in the art. However, the adjustment mechanisms of these devices generally are limited and provide variance at only one or two different points of the device. A further disadvantage of other leg support devices is that even if they are adjustable, the devices do not allow for independent adjustment of the different parts of the device. For example, in many leg supports, if the angle of the knee is altered, the height of the lower leg must also be changed in a fixed variation according to the angular position at the knee joint. Likewise, if the height of the lower leg is changed, the knee is placed in a different position. This is problematic if the resultant change of position for that portion of the limb is not desired. This type of device is illustrated in U.S. Pat. No. 4,432,108 and in 1,619,685 which provide support and elevation, but have only one mechanism for adjustment. Thus, the height of the leg is dependent on the angle of the knee. There is no independence of the adjustment mechanisms, and one or both of the leg support angles is determined by the elevation and flexion of the knee joint.

Other devices in the art are neither practical nor effective for home use because they are either too expensive, they are too difficult to adjust or they cannot be easily collapsed for transport and storage. Some known leg supports require the patients remove or lift their legs from the device for adjustment, such as U.S. Pat. No. 1,452,915, which requires the device to be physically lifted to disengage and reposition the device between the pre-formed "slots." This adjustment mechanism is disadvantageous because it is hard for the patients to achieve the repositioning of a limb by themselves. Additionally, repositioning of the device may require raising or moving the leg from a comfortable or therapeutic position, which could cause pain and delay recovery. Other adjustment mechanisms in the art require the use of additional pieces that can be easily misplaced or utilize a sliding mechanism which runs along the base frame in order to adjust the component sections of the devices. For example, U.S. Pat. No. 5,725,486 uses "slabs or wedges" placed under the leg support to adjust the height of the device, and U.S. Pat. Nos. 3,066,322 and 830,776 provide adjustable supports wherein the adjustment is provided by sliding the vertical supports along the base frame and locking them in a desired position. Another disadvantage of these adjustment mechanisms is that it is difficult for the patient to vary the height of the support without the help of another person while the leg is engaged in the support device.

The present invention, on the other hand, consists of few parts that are easy to manufacture, to assemble and to operate. The leg elevator allows patients to change the elevation of the leg according to their specific needs. Furthermore, adjustment of the preferred embodiment of the leg elevator of the present invention is easy, allowing the user to move the telescopic legs that comprise the height adjustment mechanism and the upper leg adjustment mechanism and to move the ball-ratchet mechanism of the angle adjustment mechanism without even removing the leg from the leg elevator. Another benefit of the present invention is that the adjustment of the relative angle of the upper leg support and the lower leg support can be accomplished without moving the height adjustment mechanism or the upper leg adjustment mechanism to a new position on the leg elevator base. Furthermore, the points of adjustment of the leg elevator are calibrated and easily reproducible.

The concept of an independently adjustable leg support was suggested in U.S. Pat. No. 4,901,385 which taught the use of two outer panels having a plurality of holes or apertures for receiving support rods that were attached to support panels used for receiving and positioning a leg. The '385 patent teaches that the rods are to be placed into one of a number of holes in the outer support panel grid and secured to the grid with a washer and a threaded fastener positioned on the outside of the grid panels. Thus, while independently adjustable, the adjustment mechanism is complex, and to accommodate persons of various sizes, larger or smaller outer panels with different configurations of grid holes would be required. Other disadvantages of the '385 device include the plurality of pieces that must be assembled and disassembled for use, and the difficulty in reproducing the desired elevation and angles of each component of the leg elevator. The present invention eliminates these problems and provides additional benefits that are readily apparent from the drawings and detailed description of the invention.

Furthermore, the preferred embodiment of the present invention is constructed of lightweight, plastic pipe such as polyvinyl chloride (PVC) pipe, but other materials such as lightweight aluminum material could also be used. The PVC pipe is preferred, though, because the material is inexpensive, so that it is feasible for patients to purchase the device and use it in the home. The plastic pipe also allows for easy disinfection by wiping the device with a surfactant or alcohol. This may be a useful feature if the patient suffers from post-surgical drainage, ulcers, or for multiple users, in general, in a hospital-setting.

Therefore, it is one object of the present invention to provide a leg elevator that allows for adjustment of three different mechanisms independently of one another.

It is an additional object of the invention to provide a limb elevation system that is collapsible, and is lightweight, yet sturdy, for storage and transfer.

Further objects and benefits of the invention are readily apparent from the drawings and the description of the invention.

SUMMARY

The present invention provides an adjustment mechanism for an appendage elevation system, such that adjustment mechanism has a housing, a clearance portion, first and second pin members telescopically received within the housing, a telescopic engagement mechanism mounted in the clearance portion and adapted to telescopically move the pin members, and a locking mechanism adapted to lock the pin members in a rigid position. The present invention also provides multiple embodiments of the locking mechanism. A first embodiment has segments in the housing which accepts and restricts movement of the telescopic engagement mechanism. A second embodiment of the locking mechanism has a spring button attached to a pin member which engages an aperture in the housing to restrict movement or the telescopic engagement mechanism. A third embodiment of the locking mechanism has a sleeve which engages the telescopic engagement mechanism to restrict movement. A method for unlocking the adjustment mechanism, repositioning the adjustment mechanism to another position, and locking the adjustment mechanism is also disclosed.

The embodiments of the present invention result in advantages not provided by adjustment mechanisms known in the art. Other objects, features, and advantages of the present invention will be readily appreciated from the following description and appended claims. The description makes reference to the accompanying drawings, which are provided for illustration of the invention. However, such description does not represent the full scope of the invention. The subject matter regarded as the present invention is particularly pointed out and distinctly claimed at the conclusion of the specification.

DETAILED DESCRIPTION

Figure 1:
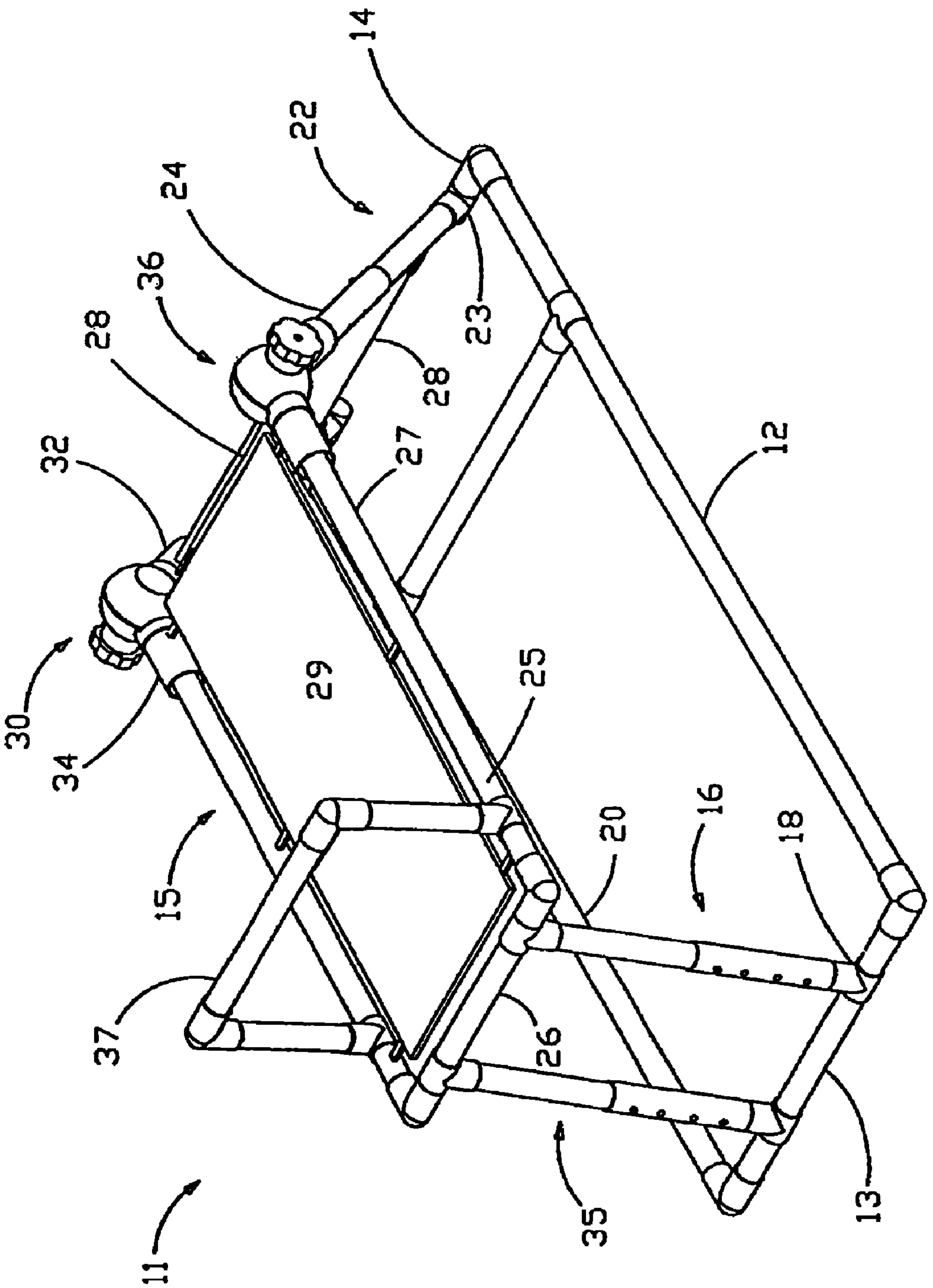
FIG. 1 is a perspective view of the leg elevator.

FIG. 1 shows the leg elevator 11 of the present invention, which is comprised of a base 12, a lower leg support 15, a height adjustment mechanism 16, an upper leg adjustment mechanism 22, an upper leg platform 28, and an angle adjustment mechanism 30. The leg elevator 11 is designed such that when a person is in a sitting or reclining position and the base 12 is on the floor, mattress or other flat surface, the upper leg adjustment mechanism 22 is closer to the person's body than the height adjustment mechanism 16, the upper leg or thigh portion of the person rests on the upper leg platform 28, and the lower leg or calf portion of the person rests on the lower leg support 15, with the angle adjustment mechanism 30 positioned generally under the knee joint of the person.

Referring to FIG. 1, the base 12 of the leg elevator 11 has a lower leg end 13 and an upper leg end 14. The lower leg end 13 of the base 12 is located near the patient's foot and calf portion of the leg when the leg elevator 11 is in use. The upper leg end 14 of the base 12 is located near the thigh portion of the leg when the leg elevator 11 is in use. The lower leg support 15 is adapted to receive the calf portion of the leg when the leg elevator 11 is in use. The lower leg support 15 can be further comprised of a lower leg support frame 25 and a lower leg platform 29 that is connected in an operable manner to lower leg support frame 25. The lower leg support frame 25 has a first end 26 near the lower leg end 13 of the base 12, and the lower leg support frame 25 has a second end 27 near the angle adjustment mechanism 30. The leg elevator 11 also has an upper leg platform 28 that is supported by the upper leg adjustment mechanism 22. The upper leg platform 28 is designed to receive and support the upper leg of the patient when the leg elevator 11 is in use.

Referring still to FIG. 1, the height adjustment mechanism 16 has a first end 18 and a second end 20. The height adjustment mechanism 16 is positioned between the lower leg end 13 of the base 12 and the lower leg support 15, such that the first end 18 of the height adjustment mechanism 16 is connected to the lower leg end 13 of the base 12 and the second end 20 of the height adjustment mechanism 16 is attached to the first end 26 of the lower leg support frame 25. The height adjustment mechanism 16 is used to adjust the height of the lower leg support 15 above the base 12. More precisely, the height adjustment mechanism 16 adjusts the height of the first end 26 of the lower leg support frame 25 and the lower leg platform 29 above the lower leg end 13 of the base 12.

The upper leg adjustment mechanism 22 is connected to the upper leg end 14 of the base 12. The upper leg adjustment mechanism 22 has a first end 23 connected to the upper leg end 14 of the base 12 and a second end 24 connected to the angle adjustment mechanism 30. The upper leg adjustment mechanism 16 is used to adjust a distance between the upper leg end 14 of the base 12 and the lower leg support 15, particularly the second end 27 of the lower leg support frame 25 and the lower leg platform 29.

The angle adjustment mechanism 30 has a first end 32 and a second end 34, and the angle adjustment mechanism is positioned between the upper leg adjustment mechanism 22 and the lower leg support 15. More precisely, the first end 32 of the angle adjustment mechanism 30 is connected to the second end 24 of the upper leg adjustment mechanism 22, and the second end 34 of the angle adjustment mechanism 30 is connected to the second end 27 of the lower leg support frame 25. The angle adjustment mechanism 30 is used to adjust the relative angular orientation of the upper leg platform 28 relative to the lower leg support 25, including the lower leg support frame 25 and the lower leg platform 29.

FIG. 1 also shows that in the preferred embodiment, the angle adjustment mechanism 30 is comprised of at least one ball-ratchet mechanism 36, and the height adjustment mechanism 16 is comprised of at least one telescopic leg 35. The upper leg adjustment mechanism 22 is also comprised of at least one telescopic leg 35 in the preferred embodiment of the present invention. A ball-ratchet mechanism 36 and a telescopic leg 35 are described in greater detail in reference to FIGS. 8 and 9 below.

Referring again to FIG. 1, the leg elevator 11 can also include a foot support 37 that is connected to and extends from the lower leg support 15, particularly the lower leg support frame 25 at the first end 26. The foot support 37 is adapted to engage and position the foot when the heel portion of the foot is resting on the lower leg platform 29 of the lower leg support 15 with the toe portion of the foot positioned above the heel portion of the foot. In other words, the ankle is in a flexed position with the heel resting on the lower leg platform 29 and the toes extending up into the air. The foot support 37 is useful in preventing or correcting dorsiflexion (foot drop) of the foot, whereby the foot does not maintain an upright, generally perpendicular position in relation to the rest of the leg, and instead falls to one side so that the toes are pointing sideways instead of upwards. Thus, while the present invention can be used without the foot support 37, the preferred embodiment includes a foot support 37 that keeps the foot at a relatively perpendicular angle to the rest of the leg and that can be removed if desired.

Figure 1A:
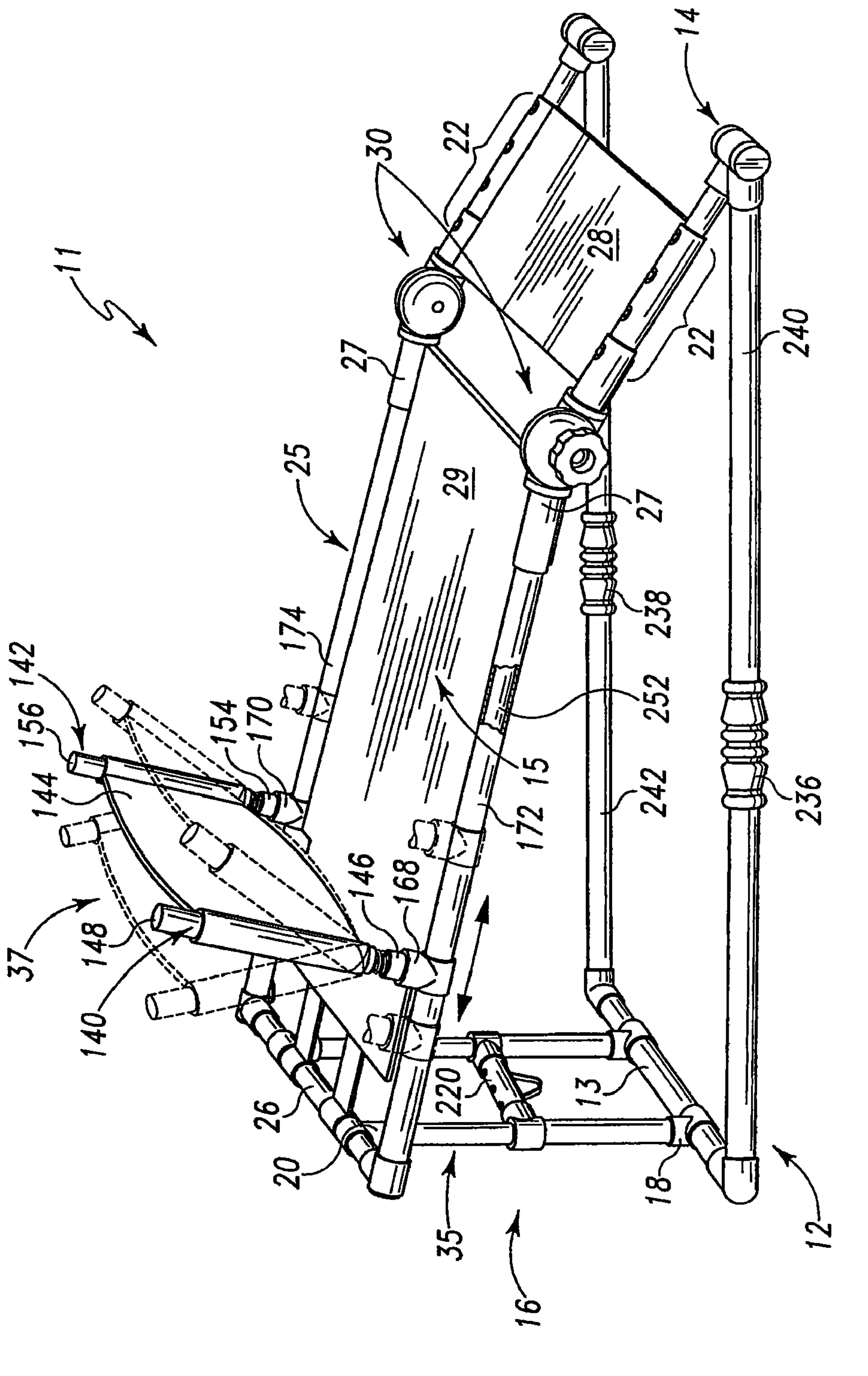
FIG. 1A is perspective view of an alternative embodiment of the leg elevator of the present invention.
Figure 1B:
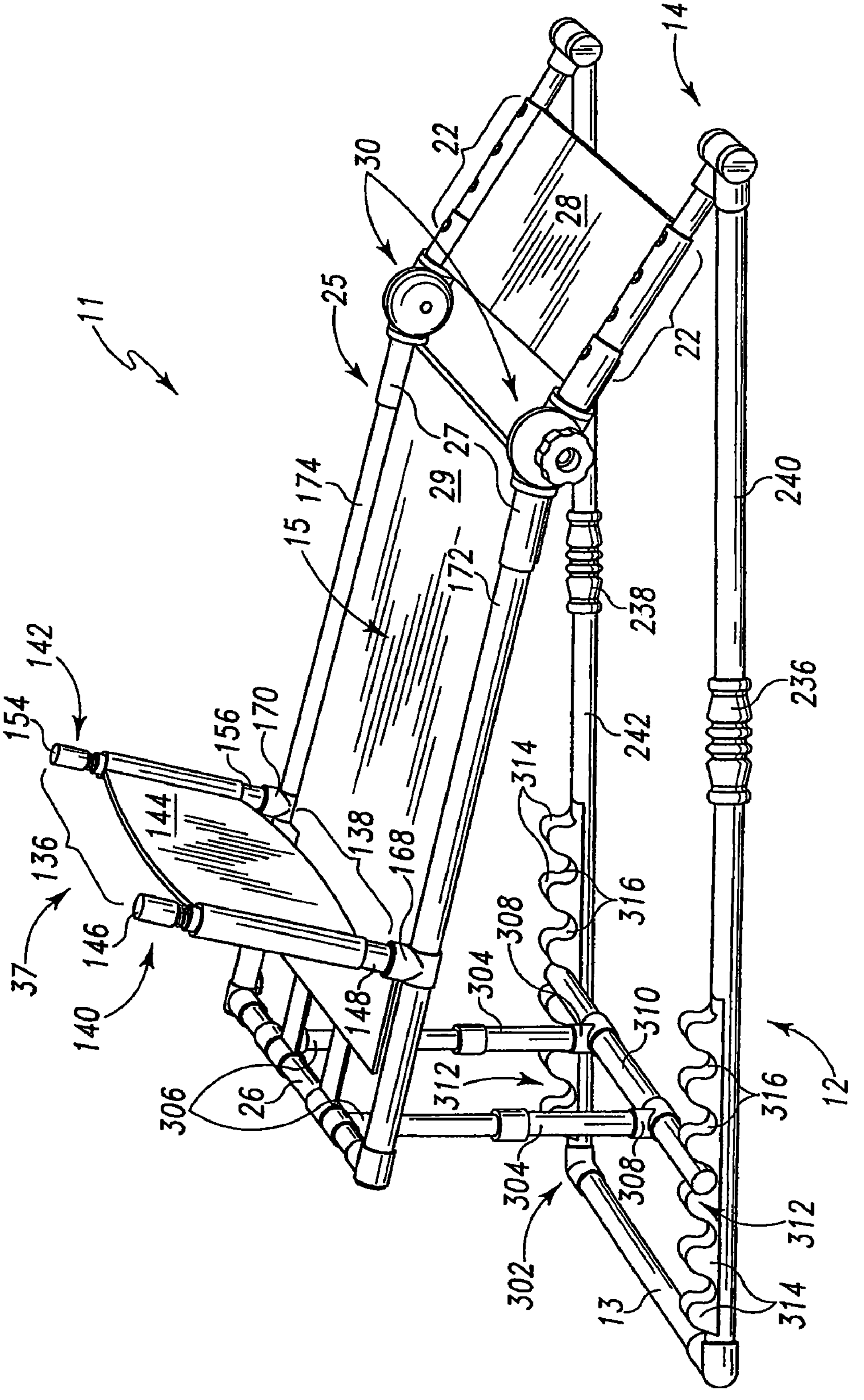
FIG. 1B is a perspective view of an alternative embodiment of the leg elevator of the present invention.
Figure 5:
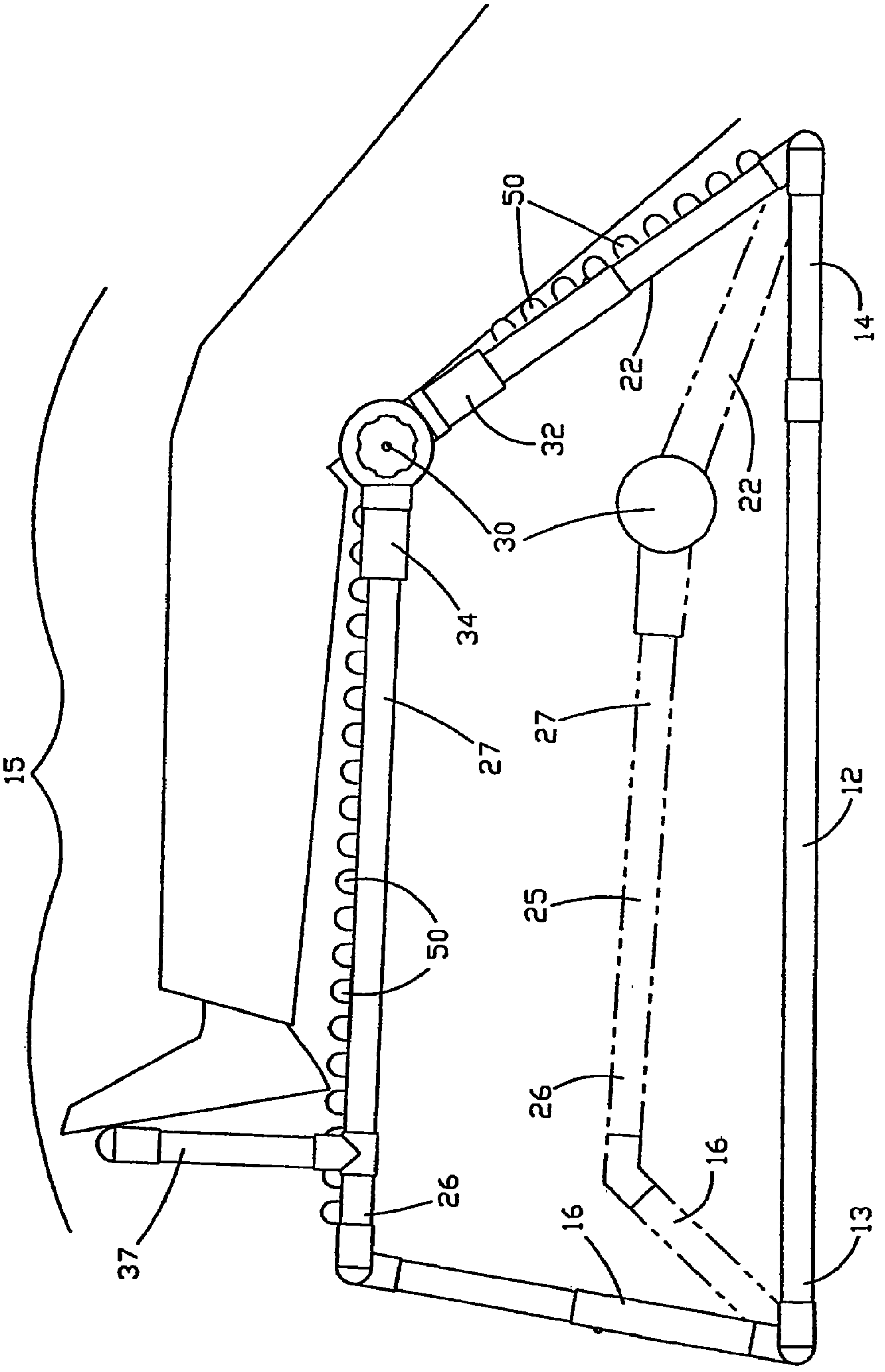
FIG. 5 is a side view of the leg elevator in use showing different positions achieved using the three independent adjustment mechanisms.
Figure 5A:
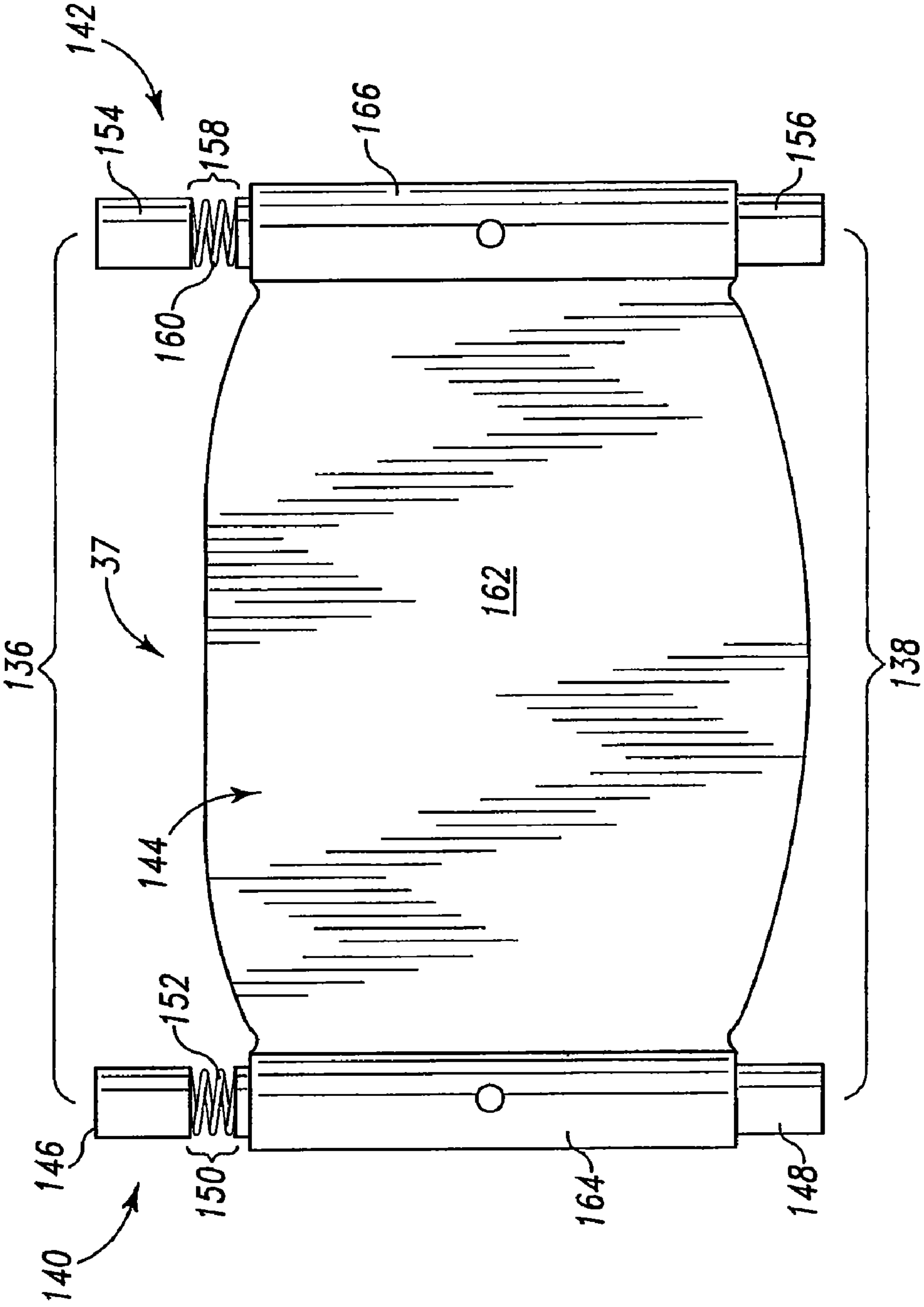
FIG. 5A is an elevated view of the foot support of an embodiment of the present invention.

As seen in FIGS. 1A, 1B and 5A, the foot support 37 may comprise a first frame engagement member 140 and a second frame engagement member 142. The first frame engagement member 140 has a first end 146, a second end 148, an at least partial discontinuity 150 in said member, and a flexible mechanism 152. The second frame engagement member 142, likewise, has a first end 154, a second end 156, an at least partial discontinuity 158 in said member, and a flexible mechanism 160. Attached along at least a portion of the first frame engagement member 140 and along a portion of the second frame engagement member 142, and extending there between, is a foot contact portion 144. The foot contact portion 144 may be attached to each frame engagement member 140, 142, by threaded connector, friction fit, tongue and groove, male/female connector, snap-fit, adhesive, Velcro, strap, fabric or pre-formed sleeve and the like. The foot contact portion 144 comprises a foot contact surface 162 and a pair of frame engagement member contact surfaces 164, 166. The foot contact portion 144 preferably comprises a width and strength sufficient to support the pressure of a foot pressing against the contact surface 162. In the preferred embodiment, the foot contact portion 144, contact surface 162, and/or frame engagement member contact surfaces 164, 166 may comprise plastic, metal, mesh, fabric, and the like.

Preferably, the frame engagement members 140 and 142 have the flexible mechanism 152 or 160 positioned toward either the first end 146, 154 or the second end 148, 156 thereof, and spaced a distance therefrom. For instance, the flexible mechanism 152 of the first frame engagement member 140 is positioned a distance from a first end 146 of the frame engagement member 140, which portion corresponds to the position of the flexible mechanism 160 of the second frame engagement member 142 which is, likewise, positioned a distance from its first end 154. The first at least partial discontinuity 150 and the second at least partial discontinuity 158 are positioned near, on, or in connection with the flexible mechanisms 152 and 160. As a result, each frame engagement member 140, 142 may flex for the pivotal movement of the foot contact portion 144 connected thereto (See FIG. 1A). More preferably, the frame engagement members 140, 142 flex in unison and in the same location at the flexible mechanism 152, 160 which is provided clearance for movement in the location of the at least partial discontinuities 150, 158.

The first frame engagement member 140 and second frame engagement member 142 preferably comprise lightweight plastic material, such as, but not limited to, PVC tubing consistent with the features of the leg elevator system of the present invention, but may also comprise other materials suitable for the purposes provided including metal tubing, reinforced tubing, solid rods, and the like. Various shapes and dimensions are also contemplated without departing from the overall scope of the present invention. The discontinuities 150, 158 of the first and second frame engagement members 140, 142 preferably comprise a spacing, indentation, groove, and/or separation in the surface of the frame engagement member 140, 142 that permits an amount of pivotal or lateral movement of two adjacent surfaces. However, while a spacing, indentation, groove or separation are specifically disclosed, alternatives are also contemplated, such as flexible material, including flexible plastic, rubber, malleable metal, and the like. The flexible mechanisms 152, 160 preferably comprise wound coil springs mounted within a portion of the frame engagement member 140, 142 having sufficient resilience and strength to provide at least a partial resistance to movement, durability to withstand multiple uses, and to permit an easy return to a resting position after each use. In the preferred embodiment the coil springs are thick, tightly wound springs. The flexible mechanisms 152, 160 of the preferred embodiment are set within the frame engagement members 140, 142 and extend within a portion thereof. The flexible mechanisms may be secured in place by any means known in the art.

As indicated herein, the foot support 37 is connected to and extends from the lower leg support 15, and preferably, the lower leg support frame 25 near a first end 26. To facilitate same, the lower leg support frame 25 is provided with a first receptor 168 and a second receptor 170. Each receptor 168, 170 is slidably mounted on the lower leg support frame 25, and preferably mounted for movement along first 172 and second 174 parallel frame elements. As can be seen from the Figures, in the preferred embodiment of the present invention, the parallel frame elements 172, 174 comprise substantially cylindrical tubes extending between the angle adjustment mechanism 30 and the first end 26 of the lower leg support 15. The receptors 168, 170 correspondingly comprise a cylindrical or partial cylindrical opening for receiving the parallel frame elements 172, 174 therein. As a result, each receptor 168, 170 may be positioned at any point along the parallel frame element 172 or 174, which permits positional adjustment of the foot support 37 to account for variations in leg length.

The first receptor 168 matingly receives a first 146 or second 148 end of the first frame engagement member 140 of the foot support 37 (see FIGS. 1A and 1B). Similarly, the second receptor 170 matingly receives a first 154 or second 156 end of the second frame engagement member 142. Preferably, the connection between the frame engagement member 140 or 142 and the receptor 168 or 170 comprises a male/female connection, allowing for the easy positioning and removal of the first and second frame engagement members 140, 142 on or from the lower leg support frame 25, although any means of removably positioning the foot support 37 on the lower leg support 15 would be acceptable for purposes of the present invention. In the preferred embodiment, the foot support 37 has a first side 136 and a second side 138. The first side 136 comprises the first ends 146, 154 of the frame engagement members 140, 142. The second side 138 comprises the second end 148, 156 of the frame engagement members 140, 142. Thus, when the foot support 37 is in position, the receptors 168 and 170 simultaneously engage either the first end 146 of the first frame engagement member 140 and the first end 154 of the second frame engagement member 142 or the second end 148 of the first frame engagement member 140 and the second end 156 of the second frame engagement member 142. (Compare FIGS. 1A and 1B.)

In addition, the foot contact portion 144 is positioned so that the ends of the frame engagement members 146, 148, 154, 156 each extend a distance away from the foot contact portion. As indicated above, the flexible mechanisms 152 and 160 are each positioned near a corresponding end of the respective frame engagement member 140, 142. Further, the flexible mechanisms 152, 160 are positioned between the ends 146, 154 of the frame engagement members 140, 142 and the connection of the foot contact portion 144, namely frame member contacts 164, 166. As a result, when the first ends 146 and 154 of the frame engagement members 140, 142 are received within the receptors 168, 170, the flexible mechanisms 152 and 160 are positioned between the foot contact portion 144 and the receptors 168, 170, and therefore the frame 25 of the lower leg support 15. Additionally, the discontinuities 150 and 158 may also be positioned between the foot contact portion 144 and the receptors 168, 170. As a result, the foot support 37 is retained in position on the leg elevator system 11, but the foot contact portion 144 and portions of the first and second frame engagement members 140, 142 are pivotally movable to different angular positions. This angular flexibility permits the patient to flex the foot and ankle, and thereby perform an amount of movement to strengthen the foot and associated muscle groups while continuing to support the leg on the leg elevator system.

Alternatively, the foot support 37 can be rotated 180° for non-flexible, rigid support of the foot. Namely, the second ends 148, 156 of the first and second frame engagement members 140, 142 are matingly received within the first and second receptors 168, 170. Due to the lack of a flexible mechanism between the engagement with the receptors and the foot support portion 144, the foot support is maintained rigidly in position. Thus, the foot support in this position provides a supportive surface for maintaining the foot at a particular angle as described hereinabove.

Accordingly, the foot support 37 comprises both a flexible portion on a first side 136 and a non-flexible portion on a second side 138 which can be utilized interchangeably to accommodate the patient's needs. In sum, the foot support mechanism of this embodiment comprises four posts, two of which are flexible to permit angular variation, and two of which are rigid or non-moveable to provide a stationary support for the foot and/or ankle. A foot support contact surface is retained between the posts for assisting in the support of the foot. The foot support mechanism is retained on the lower leg support by receptors that are provided on the frame. These receptors are moveable along the frame allowing for the displacement or positioning of the foot support on the frame to accommodate various leg lengths.

Figure 2:
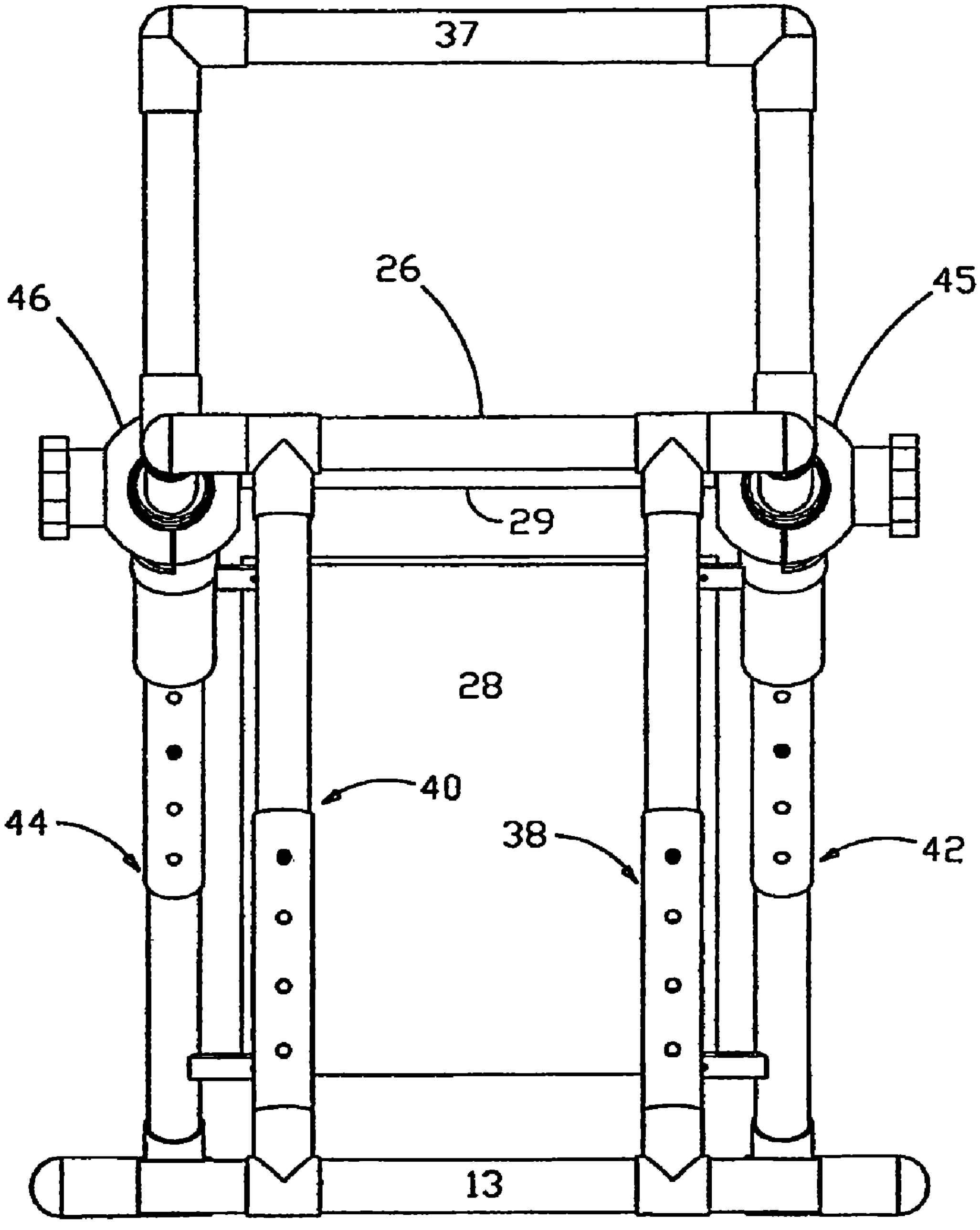
FIG. 2 is an end view of the leg elevator from the lower leg end of the base.
Figure 2A:
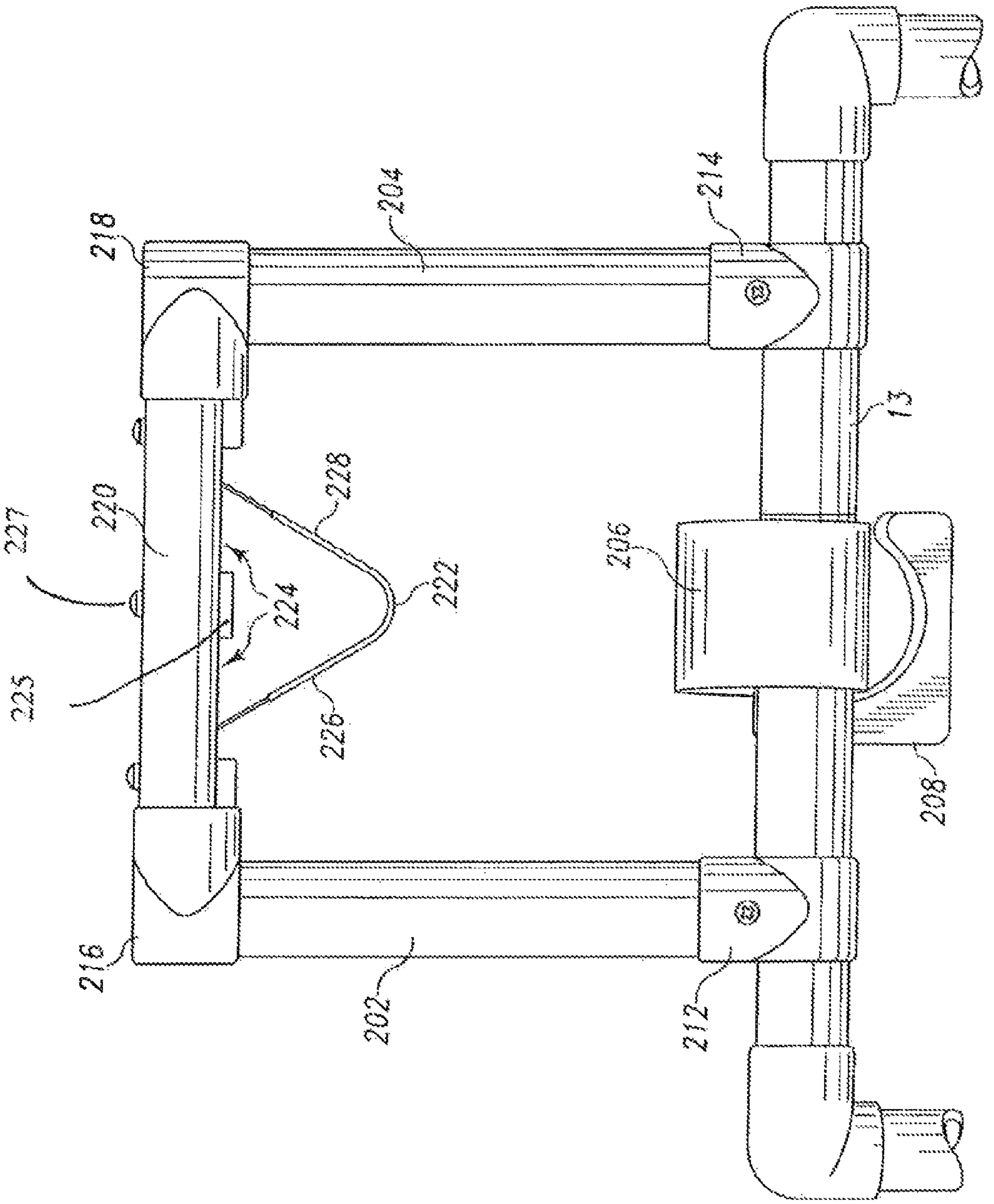
FIG. 2A is a partial end view from the lower leg end of the base of an alternative embodiment of the present invention.

FIG. 2 is an end view of the leg elevator 11 from at position at the lower leg end 13 of the base 12. From the closest portion of the leg elevator 11 depicted in FIG. 2 moving toward the opposite end of the leg elevator 11 in the view, FIG. 2 shows the lower leg end 13 of the base, a first telescopic leg 38, a second telescopic leg 40, the first end 26 of the lower leg support frame 25, the foot support 37, the lower leg support platform 29, a first ball-ratchet mechanism 45, a second ball-ratchet mechanism 46, the upper leg platform 28, a third telescopic leg 42, and a fourth telescopic leg 44.

More specifically, FIG. 2 shows a first telescopic leg 38 between the lower leg end 13 of the base 12 and the first end 26 of the lower support frame 25. A first telescopic leg is used to adjust a height of the lower leg support 15 above the base 12. A second telescopic leg 40 is positioned between the lower leg end 13 of the base 12 and the first end 26 of the lower leg support frame 25. A second telescopic leg 40 is used to adjust the height of the lower leg support 15 above the base 12. A third telescopic leg 42 and a fourth telescopic leg 44 are used to adjust the distance between the upper leg end 14 of the base 12 and the lower leg platform 29 which is attached to the lower leg support frame 25. A third telescopic leg 42 is connected to the upper leg end 14 of the base 12, and a fourth telescopic leg 44 is also connected to the upper leg end 14 of the base 12. FIG. 2 also shows that a first ball-ratchet mechanism 45 is connected between the second end 27 of the lower leg support frame 25 and a third telescopic leg 42. A second ball-ratchet mechanism 46 is connected between the second end 27 of the lower leg support frame 25 and a fourth telescopic leg 44. As shown in FIG. 2, the upper leg platform 28 is operably connected between a third telescopic leg 42 and a fourth telescopic leg 44.

Figure 3:
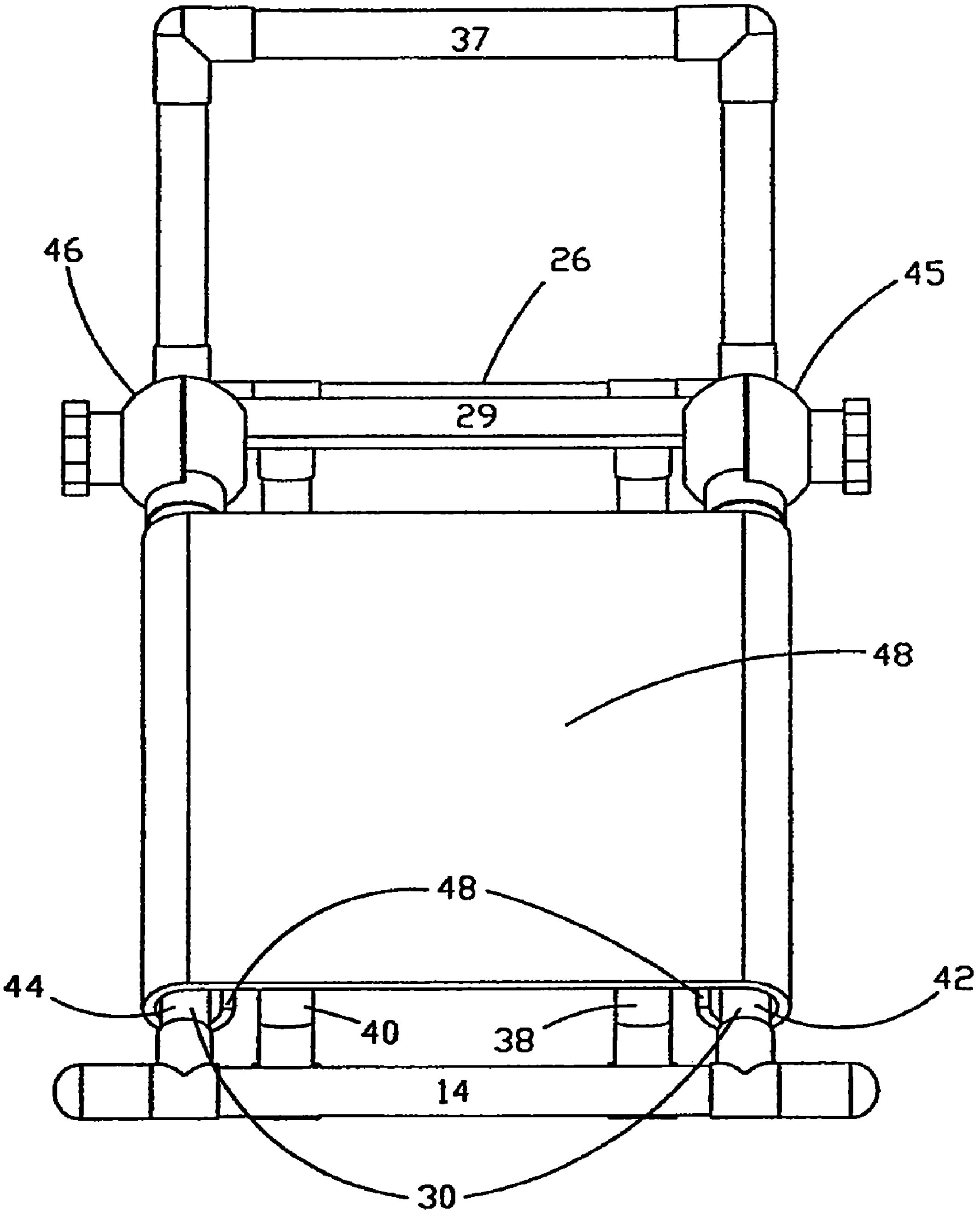
FIG. 3 is an end view of the leg elevator from the upper leg end of the base showing an alternative embodiment of the upper leg platform which uses a length of material forming a sling to receive and support the leg.

FIG. 3 is an end view of the leg elevator 11, looking at the leg elevator 11 from at position at the upper leg end 14 of the base 12. From the closest portion of the leg elevator 11 depicted in FIG. 3 moving toward the opposite end of the leg elevator 11 in the view, FIG. 3 shows the upper leg end 14 of the base, an alternative embodiment of the upper leg platform 28 comprising a length of material 48, a third telescopic leg 42, a fourth telescopic leg 44, a first ball-ratchet mechanism 45, a second ball-ratchet mechanism 46, the lower leg support platform 29, the first end 26 of the lower leg support frame 25, the foot support 37, a first telescopic leg 38 and a second telescopic leg 40.

The upper leg platform 28 can be comprised of a variety of materials. The preferred embodiment shown in FIG. 1 utilizes a substantially rigid material that is formed to receive the leg. However, the upper leg platform 28 can also be comprised of a length of material 48 that is supported by the upper leg adjustment mechanism 22. As shown in FIG. 3, an alternative embodiment of the upper leg platform 28 comprising a length of material 48 that is supported by the upper leg adjustment mechanism 30, forms a sling to receive and support the upper leg portion of the patient using the leg elevator 11. For example, a laminated foam sling pad may be used as a platform in an embodiment of the present invention. FIG. 2 also shows that the length of material 48 that forms the upper leg platform 28 in the alternative embodiment is connected between a third telescopic leg 42 and a fourth telescopic leg 44 which comprise the upper leg adjustment mechanism 30. Preferably the length of material 48 is adapted such that it wraps around the third telescopic leg 42 and the fourth telescopic leg 44 and attaches to the underside of the length of material 48 that forms the upper leg platform 28 using means such as a hook and loop fabric system commonly referred to as “Velcro.”

However, other means of attaching the upper leg platform 28 to the upper leg adjustment mechanism 22 could be utilized with the leg elevator 11. The upper leg platform 28 can be attached to the upper leg adjustment mechanism 22 in any manner that allows the upper leg adjustment mechanism 22 to support the upper leg platform. An alternative attachment mechanism for the length of material 48 could include snaps or a buttons that are located on the underside of the length of material 48 or snaps or rivets that are located on the upper leg adjustment mechanism 22. If the upper leg platform 28 is of the rigid type, the attachment mechanism could be means such as rivets, clamping devices, or rigid straps that are formed to connect the upper leg platform 28 to the upper leg adjustment mechanism 22.

Figure 4:
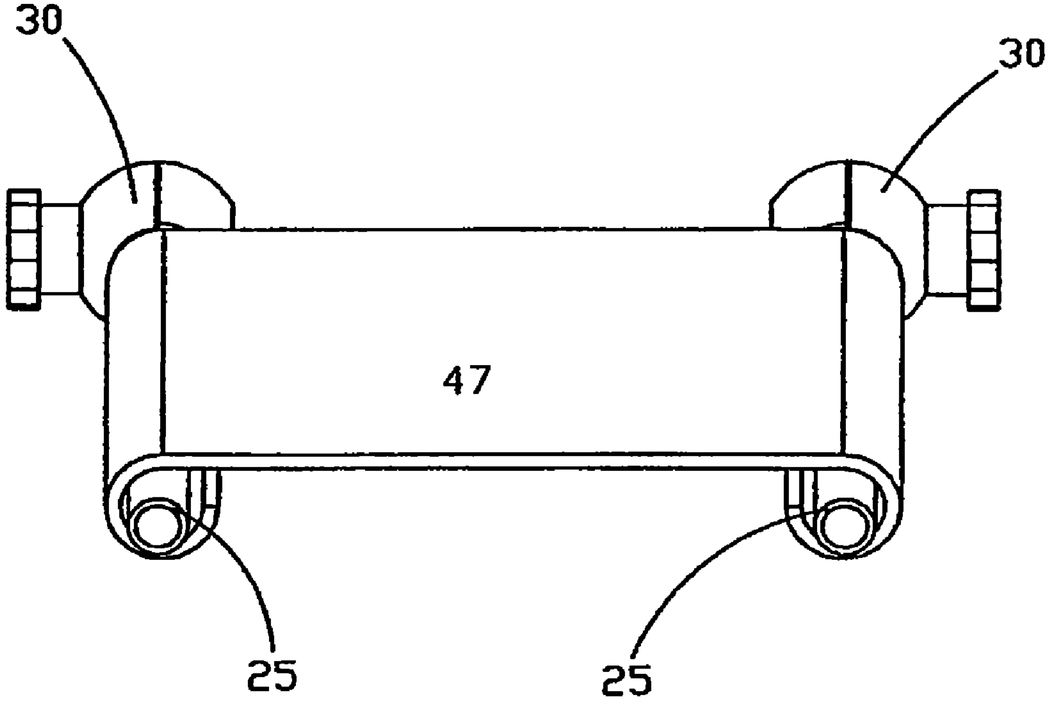
FIG. 4 is cross section of an alternative embodiment of the lower leg platform which uses a length of material forming a sling to receive the leg.

The lower leg platform 29 is similar to the upper leg platform 22 in that the lower leg platform 29 can also be formed of a variety of materials. The lower leg platform 29 is adapted to receive and support the calf portion of the leg. FIG. 4 shows a cross section of the lower leg support frame 25 and an alternative embodiment of the lower leg platform 29 that utilizes a length of material 47 that is suspended from the lower leg support frame 25 and is adapted to form a sling to receive and support the lower leg. FIG. 4 also shows the angle adjustment mechanism 30.

The lower leg platform 29 can be attached to the lower leg support frame 25 by a variety of means that are operable with the leg elevator 11. For example, if the lower leg platform 29 is of the rigid type (as shown in FIGS. 1 and 2), the lower leg platform 29 can be attached to the lower leg support frame 25 by rivets, clamping devices, or straps that are adapted to connect the lower leg platform 29 to the lower leg support frame 25 or to encircle the sides of the lower leg support frame 25. Alternatively, the lower leg support frame 25 and the lower leg platform 29 can be constructed in a manner as to make them a single part of the leg elevator 11, forming a unitary lower leg support 15. Thus, instead of having a separate lower leg platform 29 connected to the lower leg support frame 25, the lower leg support 15 can be formed out of one piece, thereby combining two parts of the leg elevator 11 into a single part and eliminating the need for a means of connecting the lower leg platform 29 to the lower leg support frame 25. Additionally, if the lower leg platform 29 is made of a length of material 47, the material 47 can be adapted to encircle the lower leg support frame 25 and attach to the underside of the length of material 47 or to the lower leg support frame 25 using a hook and loop fabric system such as “Velcro” or by other means such as the snaps or button closure described above in relation to the upper leg platform 28.

Turning now to FIG. 5, the leg elevator 11 is shown in use with a leg positioned on the leg elevator 11. FIG. 5 is a side view of the leg elevator 11 that demonstrates, using dashed phantom lines, different positions that the leg elevator 11 can be adjusted to in order to provide the desired elevated position. FIG. 5 also shows that an elongated pad 50 can be positioned on top of the upper leg platform 28 and the lower leg platform 29 of the lower leg support 15 and below the person’s leg to receive and cushion the leg. While the leg elevator 11 can be utilized without the elongated pad 50, the preferred embodiment includes the elongated pad 50 to provide greater patient comfort when using the leg elevator 11. The elongated pad 50 can be comprised of any cushioning material. The elongated pad 50 of the preferred embodiment is comprised of egg-crate foam that is commonly used on top of mattresses. The egg-crate foam has elevated portions and depressed portions that provide cushioning, while also providing a means for ventilation, which makes the material desirable for the elongated pad 50 of the present invention. In one alternative use of the leg elevator 11 (not shown), the patient places the entire leg elevator 11 under a mattress, using the mattress as the cushioning material to receive the leg. Another alternative use of the leg elevator 11 (not shown) involves placing the leg elevator 11 under a mattress, such that the leg elevator 11 is used to elevate the upper portion of a person’s body in a semi-reclining position.

Referring still to FIG. 5, the leg elevator 11 is for use with a person sitting or lying prone with the leg elevated in a position such that the underside of the calf and the underside of the thigh are resting on the upper leg platform 28 and the lower leg platform 29 of the leg elevator 11 and the foot of the person extends upward from the lower leg platform 29 and rests against the foot support 37. The upper leg adjustment mechanism 22 should be moved to a position that places the angle adjustment mechanism 30 generally under the knee joint of the person when the leg elevator 11 is in use.

FIG. 5 shows the lower leg support frame 25, which has a first end 26 above the lower leg end 13 of the base 12 and a second end 27 near the angle adjustment mechanism 30. The second end 27 of the lower leg support frame 25 is connected to the second end 34 of the angle adjustment mechanism 30. The upper leg adjustment mechanism 22 is connected to the upper leg end 14 of the base 12. The upper leg adjustment mechanism 22 is also connected to the first end 32 of the angle adjustment mechanism 30. FIG. 5 also shows (using phantom lines) that the elevation of the leg elevator 11 can be varied by adjusting the height adjustment mechanism 16. The distance between the lower leg platform 29 and the lower leg support frame 25, which comprise the lower leg support 15, and the upper leg end 14 of the base 12 can be adjusted by changing the position of the upper leg adjustment mechanism 22. Finally, the phantom lines in FIG. 5 show that the relative angular orientation of the lower leg support 15 and the upper leg platform 28 can be varied by adjusting the angle adjustment mechanism 30.

Figure 6:
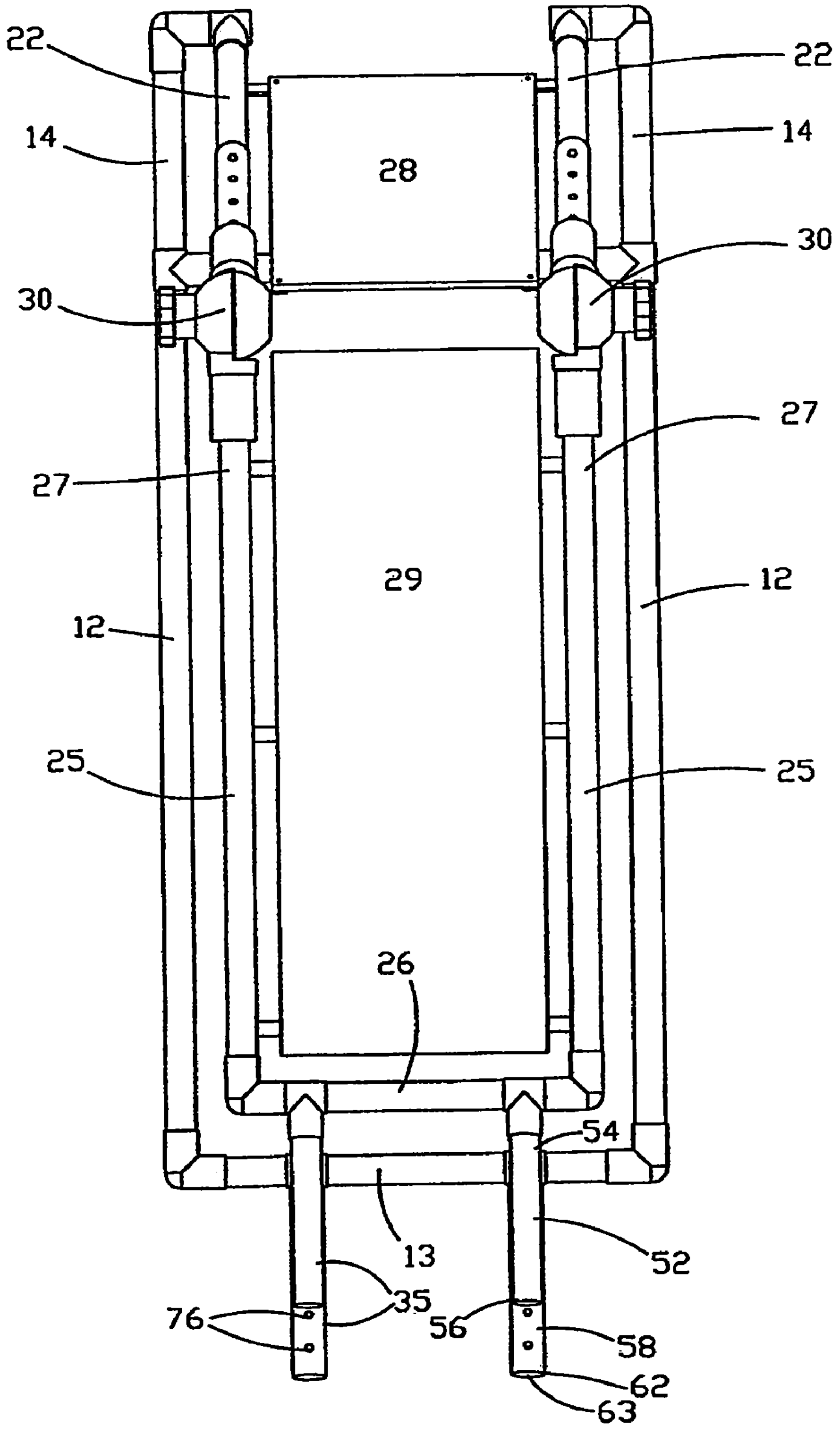
FIG. 6 is a plan view of the leg elevator in a collapsed position.
Figure 6A:
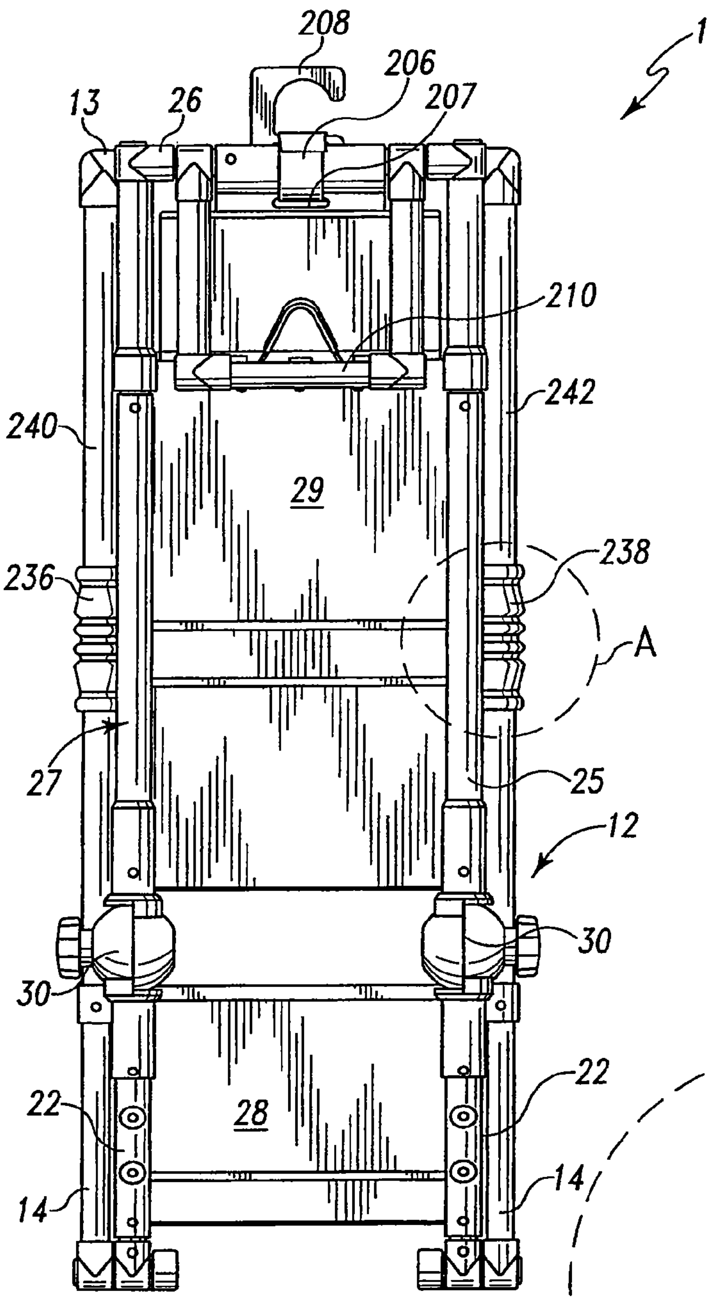
FIG. 6A is a plan view of an alternative embodiment of the leg elevator in a collapsed position.

FIGS. 6 and 6A are plan or top views of embodiments of the leg elevator 11 in a collapsed position that is relatively flat and is useful for storage or transport of the leg elevator 11. To achieve this substantially flat position of the leg elevator 11, the height adjustment mechanism 16, which in the preferred embodiment is comprised of a first telescopic leg 38 and a second telescopic leg 40, can be disengaged. The first substantially hollow section 52 of a telescopic leg 35 is separated from the second substantially hollow section 58 of a telescopic leg 35, and the angle adjustment mechanism 30 is moved to a position such that the angle is relatively flat. Therefore, the leg elevator 11 as a whole is substantially flat, which makes storage and transport easier.

Referring to FIG. 6A, similar to the embodiment described above, to flatten the leg elevator 11 for storage, the telescopic legs 35 are separated. Namely, the first section 52 of each telescopic leg is removed from the respective at least partially hollow telescopic receptor leg 202, 204 (see also FIG. 1A) of the height adjustment mechanism 210. The sections 52 and respective receptor legs 200, 204, once disengaged, are positioned to rest in close proximity to the leg elevator frame and supports, resulting in a substantially flat position.

In either embodiment, to maintain the substantially flat position, a retaining mechanism 206 may be provided to maintain the leg elevator system in a "folded" position. Preferably, the retaining mechanism 206 comprises a strap, such as a Velcro or fabric strap, that at least partially surrounds the first end 26 of the lower leg support frame 25 and the lower leg end 13 of the base 12. Preferably, the strap wraps around the ends 13 and 26 to keep same together. A slot may also be provided in one of the ends 13 or 26 or in the support 29 to allow the strap 206 to pass through. Alternative devices for retaining the flat position are also contemplated, including but not limited to, snap fit connectors, rotatable connectors, hooks, cam type mechanisms, grooves, and the like. In connection with the retaining mechanism 206 or separate therefrom, one or more hooks 208 or other mechanisms for hanging the device may be provided for alternative means of transporting and storing same.

Figure 6B:
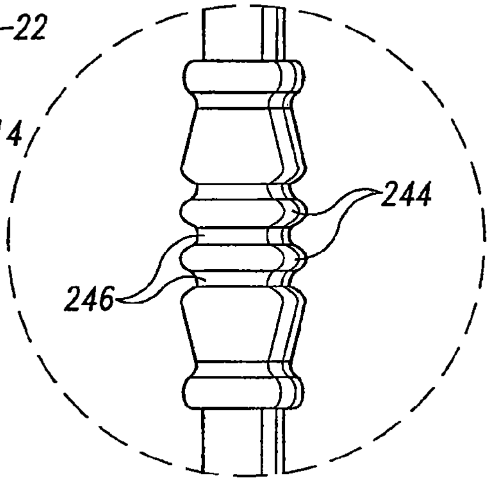
FIG. 6B is a close up view of section A from FIG. 6A.

As can be seen in FIGS. 6A and 6B, at least one embodiment of the leg elevator system comprises a grip 236 or 238 attached to the leg elevator. Preferably, the leg elevator system 11 comprises a first grip 236 attached to a first base frame member 240 and a second grip 238 attached to a second base frame member 242. Each base frame member 240, 242 is a component of base 12. While attachment to the base frame members 240 and 242 are specifically disclosed, the invention is not limited thereto, as any attachment of the grips 236, 238 to the base 12 or other frame elements would be acceptable for purposes of the present invention. As can be seen from the enlarged view of the grip 236 or 238 in FIG. 6B, each grip comprises a gripping surface having one or more ribs 244 and/or recesses 246, allowing an easy grasp of the grip 236, 238, and therefore the frame, by the user, although any texture would be acceptable for purposes of the present invention. Each grip may also comprise a foam, a rubber, or other like substance for cushioning same. Additionally, when positioned on the base 12, the grips 236, 238 restrain the movement of the leg elevator system 11, such as preventing the leg elevator from sliding upon the surface on which it is placed. Preferably, movement of the leg elevator is restrained as a result of the texture of the grips and/or the material used.

FIG. 6 also shows that the first substantially hollow section 52 of a telescopic leg 35 has a first end 54 and a second end 56. The second substantially hollow section 58 also has a first end 60 (not shown in this view) and a second end 62, with the second end 62 of the second substantially hollow section 58 defining an opening 63 to telescopically receive the second end 56 of the first substantially hollow section 52. A telescopic leg 35 of the preferred embodiment also includes a means for retaining the first substantially hollow section 52 in a desired position relative to the second substantially hollow section 58. Referring still to FIG. 6, from top to bottom, the upper leg adjustment mechanism 22, the upper leg end 14 of the base 12, the upper leg platform 28, the angle adjustment mechanism 30, the second end 27 of the lower leg support frame 25, the lower leg support platform 29, the first end 26 of the lower leg support frame 25, the lower leg end 13 of the base 12, and the plurality of apertures 76 in the second substantially hollow section 58 are also depicted.

Figure 7:
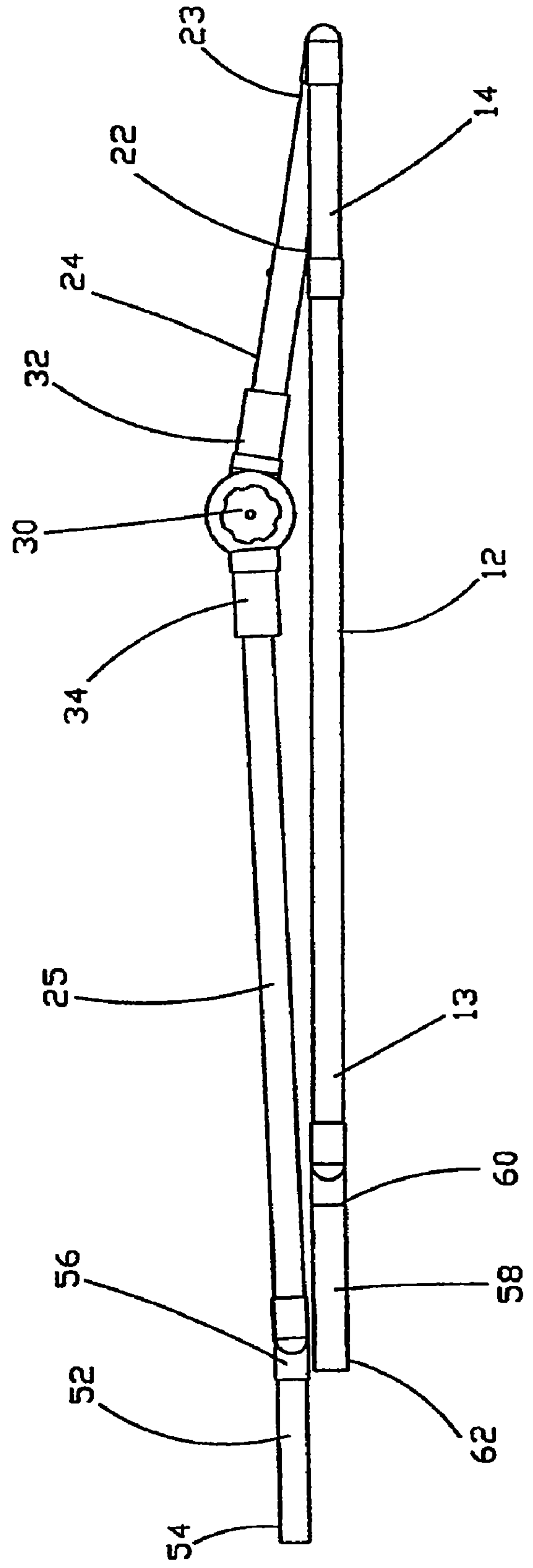
FIG. 7 is a side view of the leg elevator in a collapsed position.

FIG. 7 is a side view of the leg elevator 11 in a collapsed position as shown in FIG. 6. FIG. 7 illustrates that the leg elevator 11 is substantially flat when collapsed. FIG. 7 also shows, from left to right, the first end 54 and the second end 56 of the first substantially hollow section 52, the first end 60 and the second end 62 of the second substantially hollow section 58, the lower leg end 13 of the base 12, the lower leg support frame 25, the second end 34 and the first end 32 of the angle adjustment mechanism 30, the second end 24 and the first end 23 of the upper leg adjustment mechanism 22, and the upper leg end 14 of the base 12.

Figure 8:
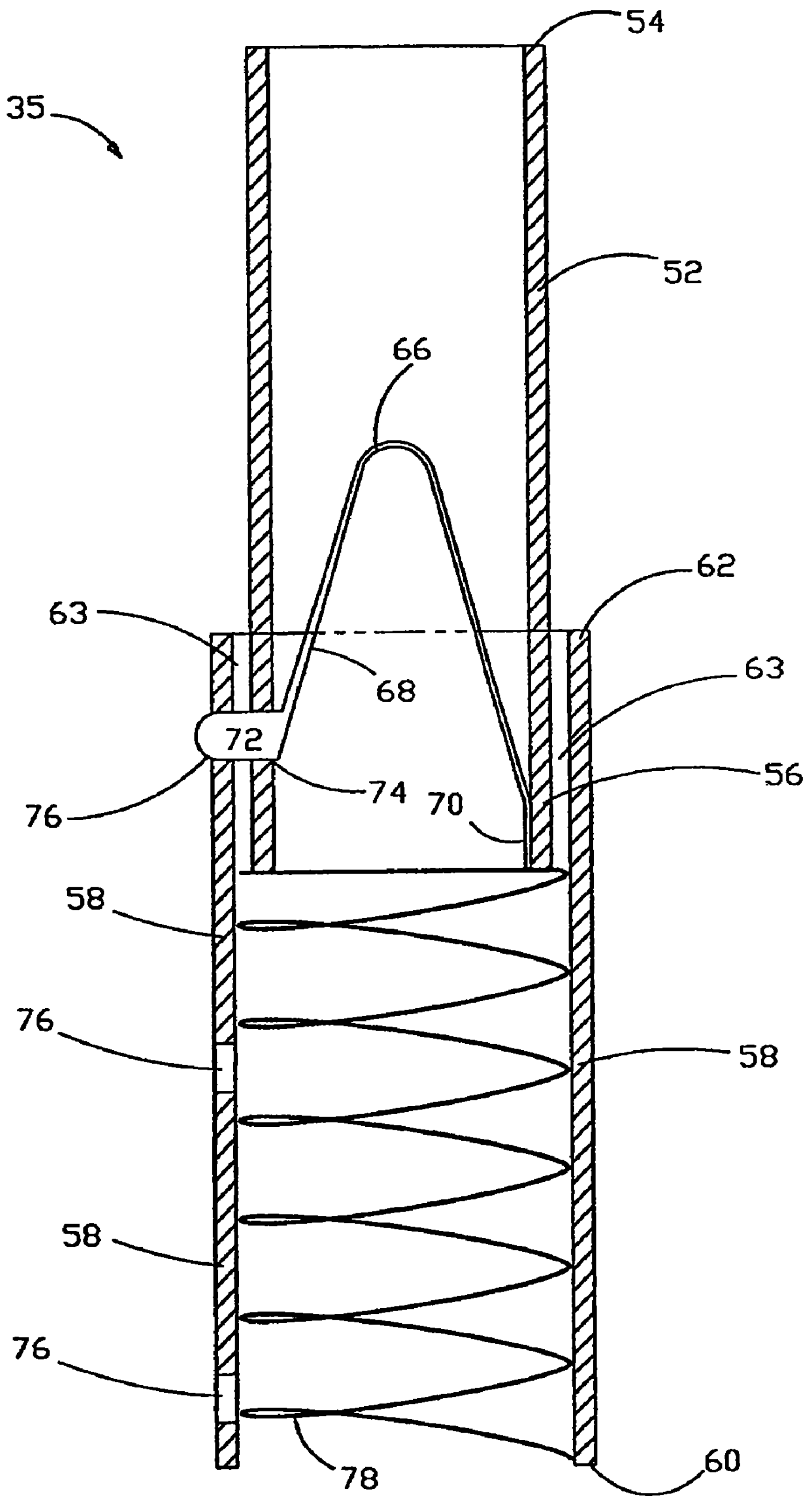
FIG. 8 is a cut away view of a telescopic leg.

Referring now to FIG. 8, a cut-away view of a telescopic leg 35 is shown. A telescopic leg 35 of the preferred embodiment includes a first substantially hollow section 52 that has a first end 54 and a second end 56. A telescopic leg 35 also has a second substantially hollow section 58 with a first end 60 and a second end 62. The second end 62 of the second substantially hollow section 58 defines an opening 63 to telescopically receive the second end 56 of the first substantially hollow section 52. Also, the telescopic leg 35 includes a means for retaining the first substantially hollow section 52 in a desired position relative to the second substantially hollow section 58.

In the preferred embodiment, the means for retaining the first substantially hollow section 52 in a desired position relative to the second substantially hollow section 58 is a U-shaped member 66 that is positioned inside the second end 56 of the first substantially hollow section 52. The U-shaped member 66 has a first end 68 and second end 70. The first end 68 of the U-shaped member 66 has a raised portion 72, and the second end 70 of the U-shaped member 66 is adapted to frictionally engage an inside surface of the second end 56 of the first substantially hollow section 52. In the preferred embodiment, the first substantially hollow section 52 also includes an aperture 74 near the second end 56 of the first substantially hollow section 52. The aperture 74 in the first substantially hollow section 52 receives the raised portion 72 of the U-shaped member 66. In the preferred embodiment, the second substantially hollow section 58 has a plurality of apertures 76 along a length of the second substantially hollow section 58. The plurality of apertures 76 in the second substantially hollow section 58 receive the raised portion 72 of the U-shaped member 66 which extends through the aperture 74 in the second end 56 of the first substantially hollow section 52. As shown near the bottom of FIG. 8, a spring 78 can be positioned inside the telescopic leg 35. The spring 78 moves the telescopic leg 35 into an extended position when the first substantially hollow section 52 and the second substantially hollow section 58 are telescopically engaged.

In the present invention, at least one telescopic leg is used for the height adjustment mechanism 16 and for the upper leg adjustment mechanism 22. Although the leg elevator 11 is operable with telescopic leg 35 acting as the height adjustment mechanism 16, the preferred embodiment utilizes a first telescopic leg 38 for adjusting a height of the lower leg support frame 25 above the base 12 and a second telescopic leg 40 for adjusting the height of the lower leg support frame 25 above the base 12. Using two telescopic legs for the height adjustment mechanism 16 provides the leg elevator 11 with more strength and stability in holding the proper elevation positions. In the preferred embodiment, the upper leg adjustment mechanism 22 includes a third telescopic leg 42 for adjusting a distance between the upper leg end 14 of the base 12 and the lower leg support frame 25 and a fourth telescopic leg 44 for adjusting a distance between the upper leg end 14 of the base 12 and the lower leg support frame 25. Each telescopic leg 35 is comprised as detailed above and is operated as described below.

To adjust a telescopic leg 35 the raised portion 72 of the U-shaped member 66 is moved to a position near the first end 70 of the U-shaped member 66, creating tension in the U-shaped member 66 by placing the first end 68 and the second end 70 of the U-shaped member 66 in close proximity to one another. The raised portion 72 of the U-shaped member 66 should be depressed far enough to disengage the raised portion 72 of the U-shaped member 66 from one of the plurality of apertures 76 in the second substantially hollow section 58. A telescopic leg 35 can then be repositioned by sliding the first substantially hollow section 52 in a linear telescopic fashion relative to the second substantially hollow section 58 until the raised portion 72 of the U-shaped member 66, which extends from the aperture 74 defined by the second end 56 of the first substantially hollow section 52, engages another aperture in the plurality of apertures 76 in the second substantially hollow section 58. The spring 78, positioned inside a telescopic leg 35, can be used to help move the first substantially hollow section 52 in a telescopic fashion relative to the second substantially hollow section 58 when the telescopic leg 35 is adjusted.

As seen in FIGS. 1A, 2A, 8A and 8B, an alternative embodiment of the lower leg adjustment mechanism comprises a height adjustment mechanism 210 having a first at least partially hollow telescopic receptor leg 202 and a second at least partially hollow telescopic receptor leg 204. The telescopic receptor legs 202 and 204, at a first end 212 and 214, are rotatably received on the lower leg end 13 of the base 12, allowing an adjustment in the angular orientation between the support frame and the height adjustment mechanism 210. Extending between, and connecting the position and/or movement of the first telescopic receptor leg 202 and the second telescopic receptor leg 204, and preferably positioned near the second ends 216, 218 thereof, is an arm 220. The arm 220 contains a telescopic engagement mechanism 222 for engaging and disengaging the telescopic legs 235.

Figure 8A:
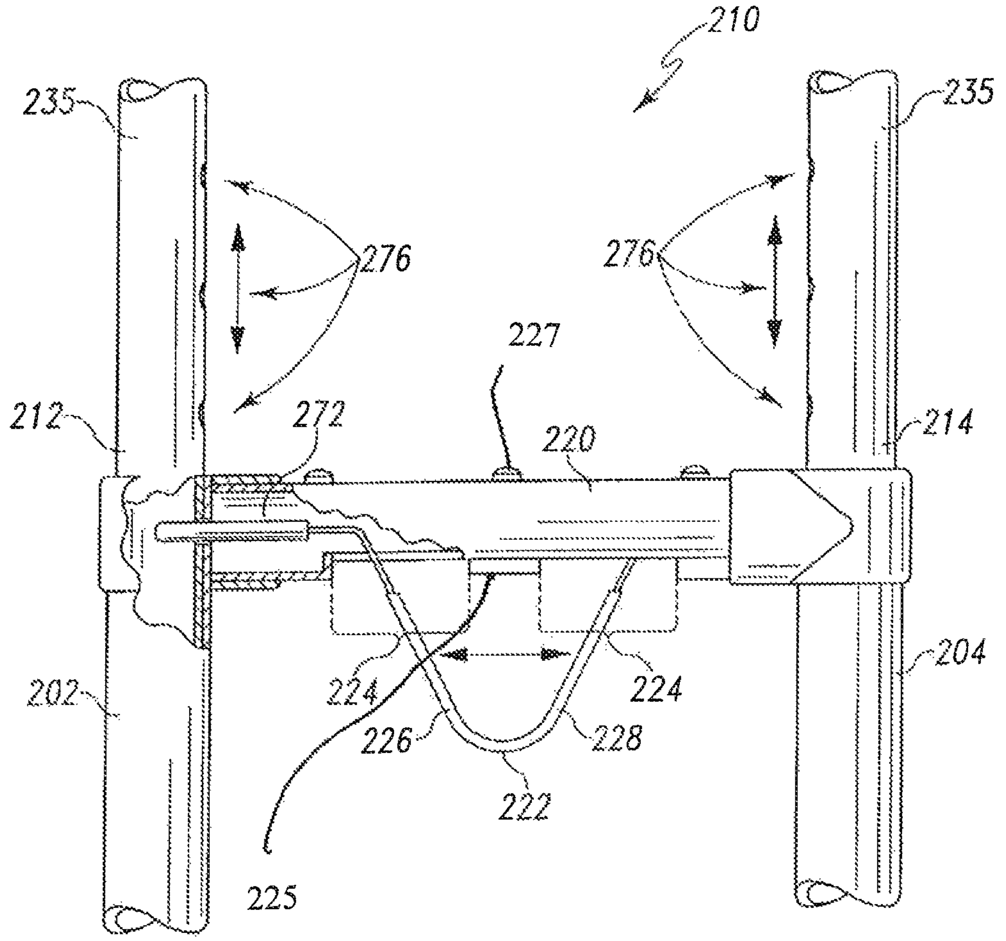
FIG. 8A is a cut away view of an embodiment of a height adjustment mechanism of the present invention.
Figure 8B:
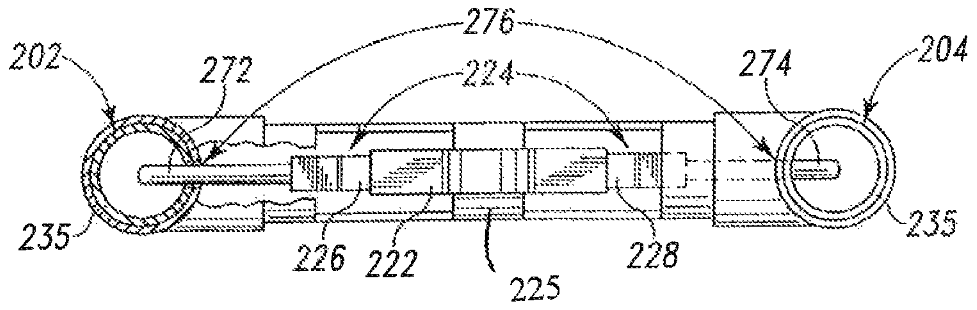
FIG. 8B is a top plan view of the height adjustment mechanism of FIG. 8A.

In particular, referring to FIGS. 8A and 8B the arm 220 comprises a substantially hollow portion and has at least one, but preferably two or more, clearance sections 224 for receiving a portion of the telescopic engagement mechanism 222. The clearance sections 224 in one or more examples of embodiments may be separated by or include one or more stops 225, 227 that prevent lateral movement of the telescopic engagement mechanism 222 beyond a preset position, such as in the illustrated embodiment beyond a central location on the arm 220. Examples of the stop include a segment of housing as shown by reference number 225 and/or a device, such as shown by reference number 227, inserted into the housing. The telescopic engagement mechanism 222 preferably comprises a manually actuatable squeeze handle having a first movable link member 226 and a second movable link member 228. Each movable link member 226, 228 extends through the clearance sections 224 into the arm 220. Within the arm 220, the first movable link member 226 is operably attached or linked to a first pin member 272 and the second movable link member 228 is operably attached or linked to a second pin member 274. Upon each telescopic leg 235 one or more pin receiving sites 234 are provided. Preferably, a plurality of pin receiving sites 234 are provided. The pin receiving sites or apertures are positioned on a surface of the leg 235 facing the arm 220, so that the pin members 272 and 274 can be removably received within the apertures 276. The apertures 234 preferably correspond to different heights of the lower leg support frame 25 above the base 12. Similar to the raised portion 72 of the U-shaped member 66 described above, the engagement of the pin member 272, 274 within the apertures 276 retains the telescopic leg in a given position dictated by the location of the aperture 276.

Operation of the height adjustment mechanism 210 is accomplished by manual operation of the telescopic engagement mechanism 222. Namely, pressure is applied to the handle 222, or the handle 222 is squeezed by the user, causing the movement of the first and second movable link members 226, 228 toward each other. Simultaneously, the movement of the movable link members 226, 228 causes the movement of the attached first and second pin members 230, 232. The movement of the movable link members 226, 228 toward one another translates into the movement of the pin members 272, 274 towards the center of the arm 220, causing the pin member 272 or 274 to disengage from the aperture 276. The disengagement of the pin member 272, 274 from the aperture 276 permits the sliding movement of the telescopic leg member 235 within the telescopic receptor leg 202, 204, thereby changing the length and/or height of each leg member. Advantageously, the telescopic engagement mechanism 222 can be operated with one hand. As a result, the user is free to use his or her other hand to grasp and/or raise or lower the lower leg support 15 relative to the base 12. Alternatively, one or both telescopic receptor legs 202, 204 may be provided with resilient spring means similar to that shown in FIG. 8 causing the movement of the telescopic legs 235 received within same upon the disengagement of the pin members 272, 274 from the apertures 276.

Preferably, the telescopic engagement mechanism 222 comprises a biasing force or is “spring-loaded”, biasing the movement of the moveable link members 226, 228 and pin members 230, 232 toward the telescopic receptor legs 202 and 204. As a result, the release of the telescopic engagement mechanism 222 by the user results in the return of the engagement mechanism 222 to its unbiased state, causing the re-engagement of the pin members 272, 274 with the respective apertures 276. The telescopic engagement mechanism 222 may also be pivotal around at least a portion of the arm 220 to allow for folding of the leg elevator system 11 and to provide an easily accessible actuatable mechanism. Additionally, the telescopic engagement mechanism 222 may comprise a protective cover or grip thereon for the user.

Figure 10:
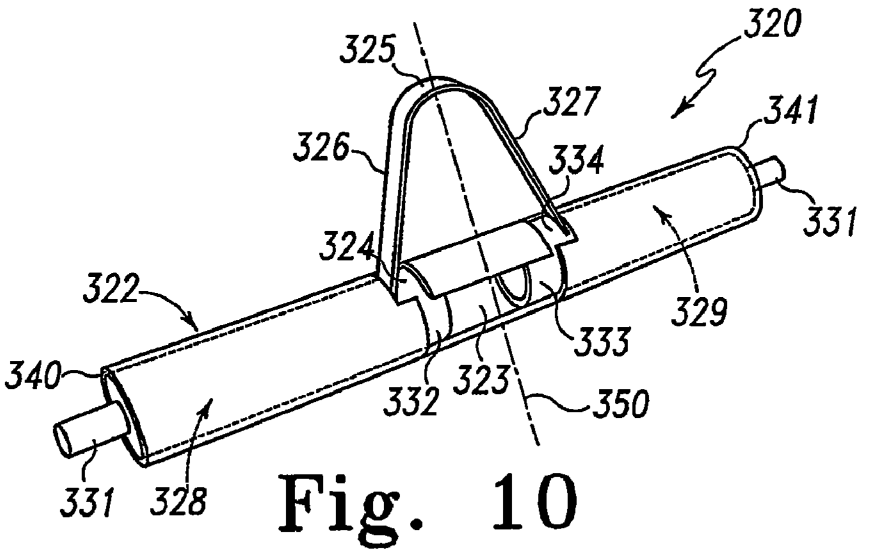
FIG. 10 is a perspective view of an embodiment of a portion of an adjustment mechanism and locking mechanism of FIG. 8A showing the locking mechanism in the locked position.

FIG. 10 is a perspective view of one exemplary embodiment of an arm or locking adjustment mechanism 320 in the locked position. As shown in FIG. 10, the locking adjustment mechanism 320 includes a housing 322 which is substantially hollow and has a clearance portion 323. Housing 322 is formed by a cylindrical member having a first end 340 and a second end 341. Clearance portion 323 has a left portion 332 and a right portion 333 forming an opening or aperture there between. While clearance portion 323 is specifically illustrated, the housing 322 may have two or more clearance portions.

Figure 11:
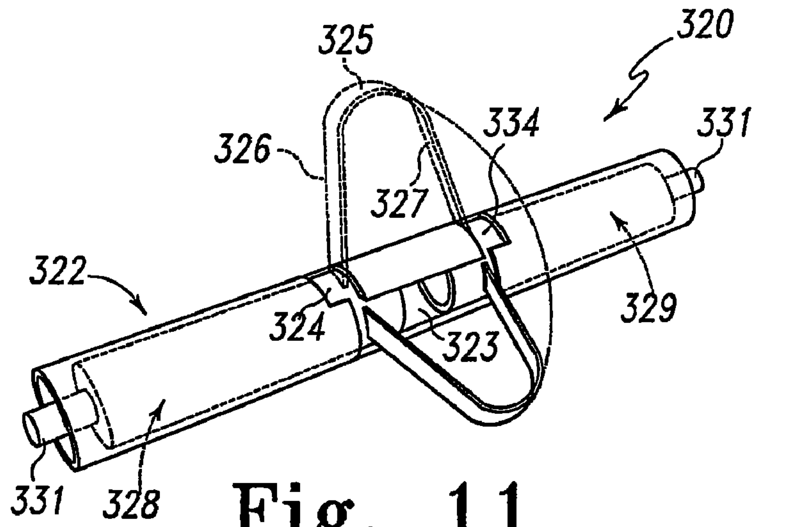
FIG. 11 is a perspective view of the embodiment of the adjustment mechanism in FIG. 10 showing the locking mechanism moved to the unlocked position.
Figure 12:
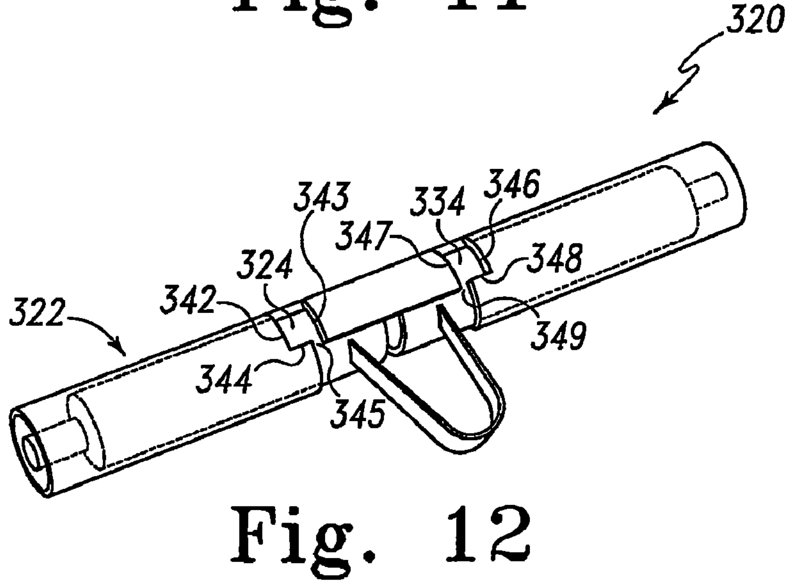
FIG. 12 is a perspective view of the embodiment of the adjustment mechanism in FIG. 11 illustrating operation while unlocked.

As shown in FIGS. 10-12, the housing 322 also has at least one, and preferably two or more locking portions. The locking portions include a left segment locking portion 324 and a right segment locking portion 334 which are in communication with the clearance portion 323. As shown in FIG. 12, the left segment locking portion 324 is formed by a first portion 342 and a second portion 343, with a third portion 344 separating the first and second portions 342, 343. The third portion 344 has a left passage 345, enabling communication between the left segment locking portion 324 and the clearance portion 323. The right segment locking portion 334 is formed by a first portion 346 and a second portion 347, with a third portion 348 separating the first and second portions 346, 347. The third portion 348 has a right passage 349, enabling communication between the right segment locking portion 334 and the clearance portion 323. As can be seen in FIGS. 10-12, the first 342, 346, second 343, 347 and third portions 344, 348 respectively form an aperture there between. First portion 342 of the left segment locking portion 324 is located closer to the first end 340 of the housing 322 than left portion 332 of the clearance portion 323. First portion 346 of the right segment locking portion 334 is located closer to the second end 341 of the housing 322 than right portion 333 of the clearance portion 323.

As shown in FIG. 10, a telescopic engagement mechanism 325 is provided in association with the locking adjustment mechanism 320. The telescopic engagement mechanism 325 preferably has a manually actuatable squeeze handle formed by a first movable link member or first arm 326 and a second movable link member or second arm 327. Each movable link member or arm 326, 327 extends from outside of the housing 322 through the corresponding locking portions 324, 334 and into the housing 322. Within the housing 322, the first movable link member or first arm 326 is operably attached or linked with a first pin member 328 and the second movable link member or second arm 327 is operably attached or linked with a second pin member 329. The first pin member 328 is telescopically received in the first end 340 of the housing 322 and the second pin member 329 is telescopically received in the second end 341 of the housing 322. The pin members 328, 329 are rotatably and slidably mounted inside the housing 322, enabling rotational and telescopic movement of the pin members 328, 329. Each pin member has pin 331 connected at one end. Pin 331 is arranged or formed to engage one or more apertures in the appendage elevator system.

Operation of this embodiment of the locking adjustment mechanism 320 is accomplished by manual operation of the telescopic engagement mechanism 325. Preferably, the telescopic engagement mechanism 325 has a biasing force or is "spring-loaded", biasing the movement of the moveable link members or arms 326, 327 and pin members 328, 329 outward from the centerline or central axis 350 of telescopic engagement mechanism 325. To this end, as shown by comparison of FIG. 10 and FIG. 11, to unlock the locking adjustment mechanism 320, pressure is applied to the telescopic engagement mechanism 325 to overcome the biasing force, for example squeezing the first and second movable link members or arms 326, 327 such that they move toward each other. The movement of the movable link members or arms 326, 327 translates into movement of the first and second pin members 328, 329 toward the center of the locking adjustment mechanism 320. Movement of the movable link members or arms 326, 327 moves the link members out of engagement with first portion 342 of the left segment locking portion 324 and first portion 346 of the right segment locking portion 334, respectively, thereby permitting rotational movement of the telescopic engagement mechanism 325 in relation to housing 322. More preferably, the left and right movable link members or arms 326, 327 are moved until each is aligned with its respective passage 345, 349. The telescopic engagement mechanism 325 may then rotate circumferentially about the housing 322, moving movable link members or arms 326, 327 from the left and right segment locking portions 324, 334, through the left and right passages 345, 349 and into the clearance section 323. Once rotated into the clearance section 323, as shown in FIGS. 11 and 12, applying additional pressure to the telescopic engagement mechanism 325 telescopically moves the movable link members or arms 326, 327 closer to each other, translating into further movement or retraction of the first and second pin members 328, 329 toward the center of the locking adjustment mechanism 320. This movement preferably disengages the pins 331 from corresponding pin receiving sites or apertures (see FIG. 8A). At the maximum position of compression of telescopic engagement mechanism 325 of the embodiment shown, the pins 331 may be received completely within housing 322. Variations thereon would not depart from the overall scope of the present invention.

Once the pins 331 are disengaged, which may occur prior to the maximum position, the user can move the locking adjustment mechanism 320 to different pin receiving sites or apertures (see FIG. 8A). Once repositioned, release of the telescopic engagement mechanism 325 allows the biasing force to move or return the first and second pin members 328, 329 away from the centerline or central axis 350 of telescopic engagement mechanism 325, causing the pins 331 to be removably received by the selected pin receiving sites or apertures.

Though engaged with pin receiving sites or apertures, the locking adjustment mechanism 320 remains unlocked, allowing for operation of the telescopic engagement mechanism 325 with one hand. In order to protect against accidental disengagement of the pins 331 from their corresponding pin receiving sites or apertures, the locking adjustment mechanism 320 can be returned to its locked state by circumferentially rotating the telescopic engagement mechanism 325 about the housing 322 from the clearance portion 323, through the left and right passages 345, 349, to the left and right segment locking portions 324, 334. The biasing force then causes movement of the first movable link member or first arm 326 into contact with first portion 342 of the left segment locking portion 324 and the second movable link member or second arm 327 into contact with first portion 346 of the right segment locking portion 334. In this position, third portion 344 of the left segment locking portion 324 and third portion 348 of the right segment locking portion 334 physically block circumferential rotation about the housing of the telescopic engagement mechanism 325. Accordingly, the telescopic engagement mechanism 325 can only rotate by applying enough pressure to overcome the biasing force and move the first movable link member or first arm 326 and the second movable link member or second arm 327 into position to circumferentially rotate through the left and right passages 345, 349.

Figure 13:
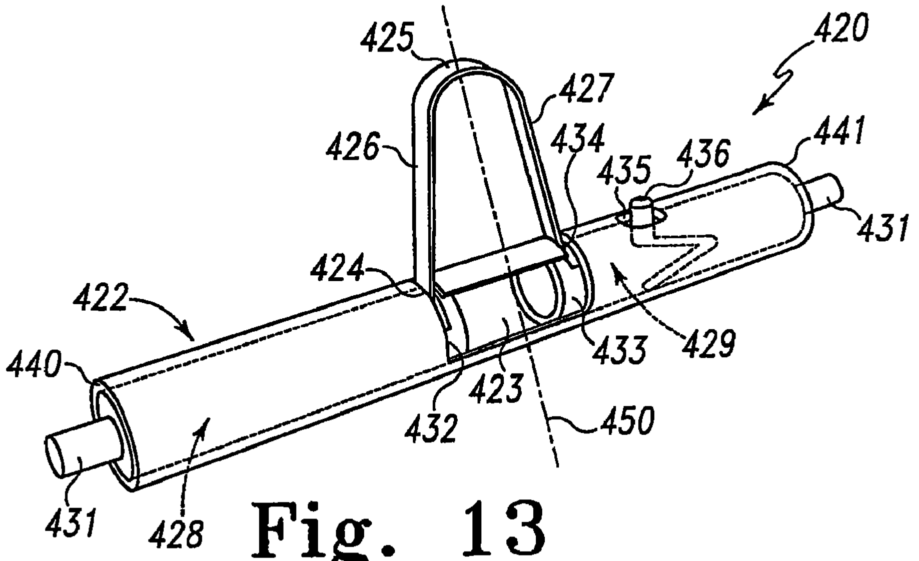
FIG. 13 is a perspective view of an alternative embodiment of an adjustment mechanism and locking mechanism of FIG. 8A showing the locking mechanism in the locked position.

FIG. 13 is a perspective view of a second exemplary embodiment of an arm or locking adjustment mechanism 420 in the locked position. The locking adjustment mechanism 420 includes a housing 422 which is substantially hollow and has a clearance portion 423. Housing 422 is formed by a cylindrical member having a first end 440 and a second end 441. Clearance portion 423 has a left portion 432 and a right portion 433 forming an aperture there between. While clearance portion 423 is specifically illustrated, housing 422 may have two or more clearance portions.

Figure 15:
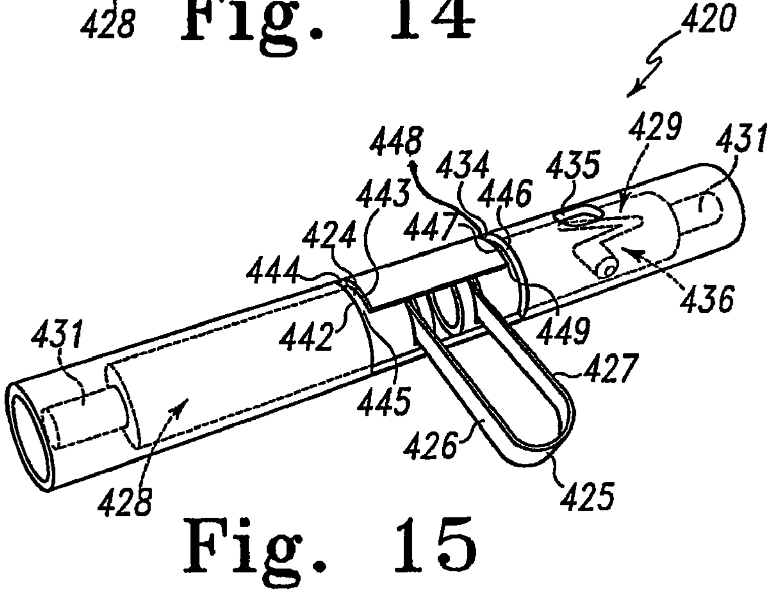
FIG. 15 is a perspective view of the embodiment of the adjustment mechanism in FIG. 14 illustrating operation while unlocked.

As best illustrated in FIGS. 13 and 15, the housing 422 also has at least one, and preferably two or more locking portions. The locking portions include a left segment locking portion 424 and a right segment locking portion 434 which are in communication with the clearance portion 423. As shown in FIG. 15, the left segment locking portion 424 is formed by a first portion 442 and a second portion 443, with a third portion 444 separating the first and second portions 442, 443 forming a slotted opening. Also separating the first and second portions 442, 443 and a distance from the third portion 444 is a left passage 445, enabling communication between the left segment locking portion 424 and the clearance portion 423. The right segment locking portion 434 is similarly formed by a first portion 446 and a second portion 447, with a third portion 448 separating the first and second portions 446, 447 forming a slotted opening. Also separating the first and second portions 446, 447 and a distance from the third portion 448 is a right passage 449, enabling communication between the right segment locking portion 434 and the clearance portion 423.

As shown in FIG. 13, a telescopic engagement mechanism 425 is provided in association with the locking adjustment mechanism 420. The telescopic engagement mechanism 425 is substantially as described with respect to the telescopic engagement mechanism 325, and preferably has a manually actuatable squeeze handle formed by a first movable link member or first arm 426 and a second movable link member or second arm 427. Each movable link member or arm 426, 427 extends from outside of the housing 422 through the corresponding locking portions 424, 434 and into the housing 422. Within the housing 422, the first movable link member or first arm 426 is operably attached or linked with a first pin member 428 and the second movable link member or second arm 427 is operably attached or linked with a second pin member 429. The first pin member 428 is telescopically received in the first end 440 of the housing 422 and the second pin member 429 is telescopically received in the second end 441 of the housing 422. The pin members 428, 429 are rotatably and slidably mounted inside the housing 422, enabling rotational and telescopic movement of the pin members 428, 429. Each pin member has pin 431 connected at one end. Pin 431 is arranged or formed to engage one or more apertures in the appendage elevator system.

Figure 14:
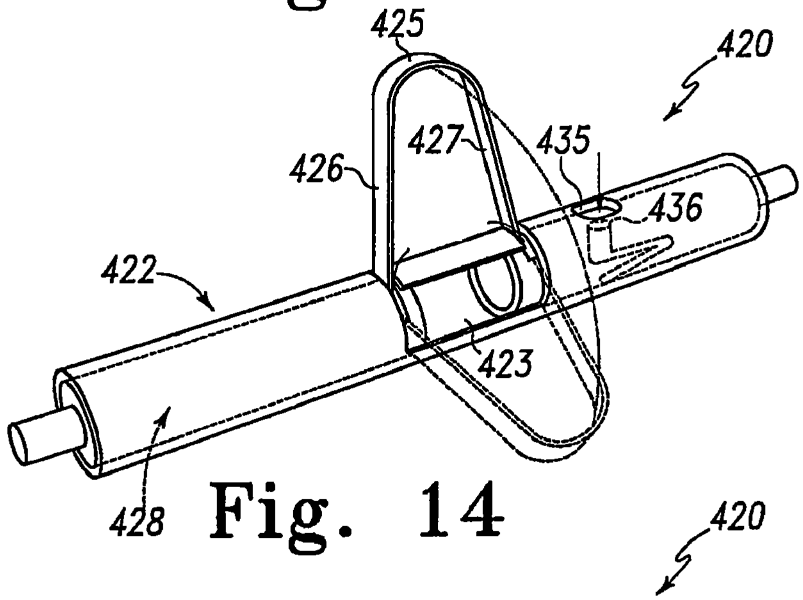
FIG. 14 is a perspective view of the embodiment of the adjustment mechanism in FIG. 13 showing the locking mechanism moved to the unlocked position.

As shown in FIGS. 13-15, the housing 422 has a housing aperture 435 located on at least one side or portion of the housing. In the illustrated embodiment, housing aperture 435 is provided on the second pin member 429 side of the housing 422. It is contemplated that more than one housing aperture may be provided on one or more sides of the housing 422. A spring button 436 is rotatably attached to a pin member corresponding to the location of aperture 435, in FIGS. 13-15 the second pin member 429. The spring button 436 has a biasing force or is "spring-loaded", biasing the movement of the spring button 436 button radially outward from the pin member 429 toward the housing 422.

As shown in FIG. 13, in the locked position, the spring button 436 engages the housing aperture 435, restricting the movement of the telescopic engagement mechanism 425, locking the locking adjustment mechanism 420 by providing a physical mechanism that restricts movement of the pin member 429 relative to the housing. More than one spring button may be provided. Likewise, though the spring button 436 is rotatably mounted to the second pin member 429 in this exemplary embodiment, in other embodiments the spring button 436 may be rotatably mounted to the first pin member 428. As such, the housing aperture 435 may be located on the first pin member 428 side of the housing 422 to correspond with the spring button 436.

Operation of this embodiment of the locking adjustment mechanism 420 is accomplished by manual operation of the telescopic engagement mechanism 425 and spring button 436. Preferably, the telescopic engagement mechanism 425 has a biasing force or is "spring-loaded", biasing the movement of the moveable link members or arms 426, 427 and pin members 428, 429 outward from the centerline or central axis 450 of telescopic engagement mechanism 425. To this end, as shown in FIG. 14, to unlock the locking adjustment mechanism 420, a user depresses the spring button 436 to a point below the housing aperture 435. The user can then rotate the telescopic engagement mechanism 425 circumferentially about the housing 422 from the left and right locking portions 424, 434, through the left and right passages 445, 449, and into the clearance section 423. The spring button 436 may follow the rotation of the pin member 429. Since there is no corresponding housing aperture for the spring button 436 to engage once the telescopic engagement mechanism 425 is in the clearance section 423, the locking adjustment mechanism 420 is in the unlocked position.

As shown in FIG. 15, a user can apply pressure to the telescopic engagement mechanism 425 to overcome the biasing force, for example squeezing the first and second movable link members or arms 426, 427 such that they move toward each other. The movement of the movable link members or arms 426, 427 translates into movement of the first and second pin members 428, 429 toward the centerline or central axis 450 of locking adjustment mechanism 420, thereby disengaging the pins 431 from corresponding pin receiving sites or apertures. At a maximum compression position of the telescopic engagement mechanism 425, the pins 431 may be received completely within the housing 422. Once disengaged, which may occur prior to the maximum position, the user can move the locking adjustment mechanism 420 to different pin receiving sites or apertures. Once repositioned, release of the telescopic engagement mechanism 425 allows the biasing force to move the first and second pin members 428, 429 away from the telescopic engagement mechanism 425, causing the pins 431 to be removably received by the different pin receiving sites or apertures.

Though engaged with pin receiving sites or apertures, the locking adjustment mechanism 420 remains unlocked, allowing the operation of the telescopic engagement mechanism 425 with one hand. In order to protect against accidental disengagement of the pins 431 from their corresponding pin receiving sites or apertures, the locking adjustment mechanism 420 can be returned to its locked state by circumferentially rotating the telescopic engagement mechanism 425 about the housing 422 from the clearance portion 423, through the left and right passages 445, 449, and into the left and right segment locking portions 424, 434. Once the housing aperture 435 is aligned with the spring button 436, the biasing force moves the spring button 436 radially outward from the pin member 429 toward the housing 422. Once in alignment, the spring button 436 engages the housing aperture 435, physically restricting rotation of the telescopic engagement mechanism 425. Accordingly, the telescopic engagement mechanism 425 can only rotate by applying enough pressure to overcome the biasing force of the spring button 436, depressing the spring button 436 to a point below the housing aperture 435. Likewise, pin members 428, 429 can only be disengaged by overcoming the biasing force of the telescopic engagement mechanism 425.

Figure 16:
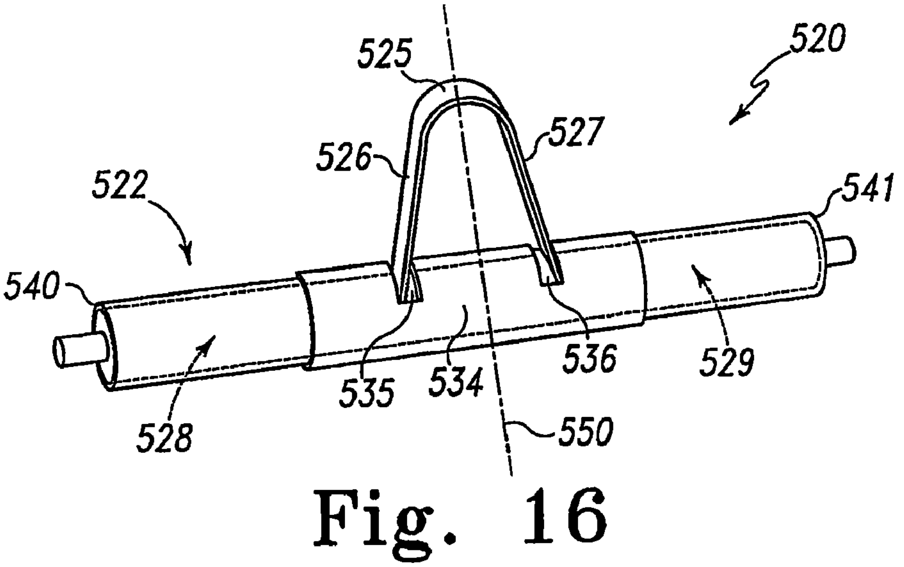
FIG. 16 is a perspective view of an alternative embodiment of an adjustment mechanism and locking mechanism of FIG. 8A showing the locking mechanism in the locked position.
Figure 17:
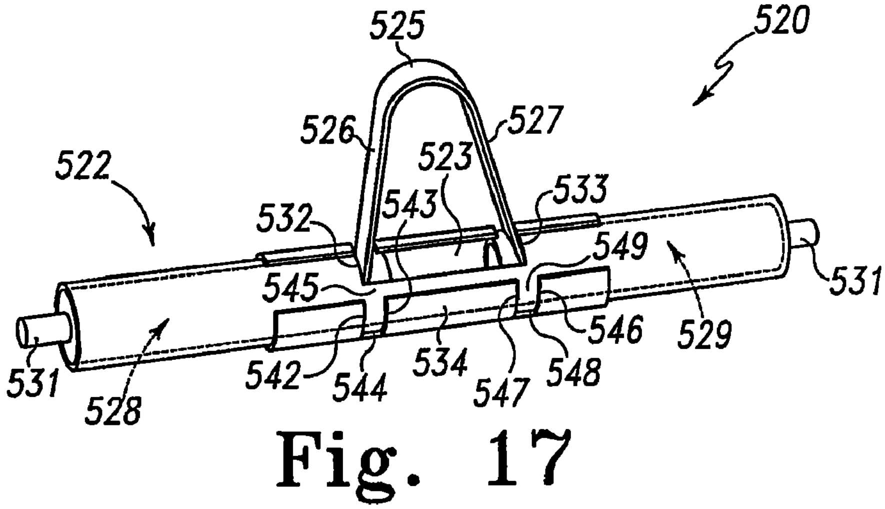
FIG. 17 is a perspective view of the embodiment of the adjustment mechanism in FIG. 16 showing the locking mechanism moved to the unlocked position.

FIG. 16 is a perspective view of a third exemplary embodiment of an arm or locking adjustment mechanism 520 in the locked position according to this invention. The locking adjustment mechanism 520 includes a housing 522 which is substantially hollow. Housing 522 is formed by a cylindrical member having a first end 540 and a second end 541. As shown in FIG. 17, the housing 522 has a clearance portion 523. Clearance portion 523 has a left portion 532 and a right portion 533 forming an aperture there between. While clearance portion 523 is specifically illustrated, housing 522 may have two or more clearance portions. As shown in FIGS. 16 and 17, a telescopic engagement mechanism 525, substantially as described with regard to telescopic engagement mechanism 325, is provided in association with the locking adjustment mechanism 520. The telescopic engagement mechanism 525 preferably has a manually actuatable squeeze handle having a first movable link member or first arm 526 and a second movable link member or second arm 527. As best shown in FIG. 17, each movable link member or arm 526, 527 extends from outside of the housing 522, through the clearance section 523 and into the housing 522. Within the housing 522, the first movable link member or first arm 526 is operably attached or linked with a first pin member 528 and the second movable link member 527 is operably attached or linked with a second pin member 529. The first pin member 528 is telescopically received in the first end 540 and the second pin member 529 is telescopically received in the second end 541. The pin members 528, 529 are rotatably and slidably mounted inside the housing 522, enabling rotational and telescopic movement of the pin members 528, 529. Each pin member has a pin 531 connected at one end. Pin 531 is arranged or formed to engage one or more apertures in the appendage elevator system.

As shown in FIGS. 16 and 17, a sleeve 534 is rotatably mounted on the housing 522 for rotation about the outer surface or circumference of the housing. Sleeve 534 is preferably substantially semicircular in that it does not cover the entire circumference of the housing 522. However, in other embodiments, the sleeve 534 may be formed of a cylinder surrounding the housing. As shown in FIG. 16, the sleeve 534 has a first segment locking portion or first receptor 535 and a second segment locking portion or second receptor 536. As shown in FIG. 17, the first segment locking portion or first receptor 535 is formed by a first portion 542 and a second portion 543, with a third portion 544 separating the first and second portions 542, 543 forming a slotted opening. Also separating the first and second portions 542, 543 and a distance from the third portion 544 is a first passage 545, enabling the first segment locking portion or first receptor 535 to receive the first movable link member or first arm 526. The second segment locking portion or second receptor 536 is formed by a first portion 546 and a second portion 547, with a third portion 548 separating the first and second portions 546, 547 forming a slotted opening. Also separating the first and second portions 546, 547 and a distance from the third portion 548 is a second passage 549, enabling the second segment locking portion or second receptor 536 to receive the second movable link member or second arm 527. As shown in FIG. 16, in the locked position, the first segment locking portion or first receptor 535 receives the first movable link member or first arm 526 and the second segment locking portion or second receptor 536 receives the second movable link member or second arm 527. In the illustrated embodiment, the sleeve 534 has slotted openings 537, 538 on one side of sleeve 534 (shown in FIG. 18). It is contemplated that one or more slotted opening 537, 538 may be provided on one or more sides of sleeve 534.

Figure 18:
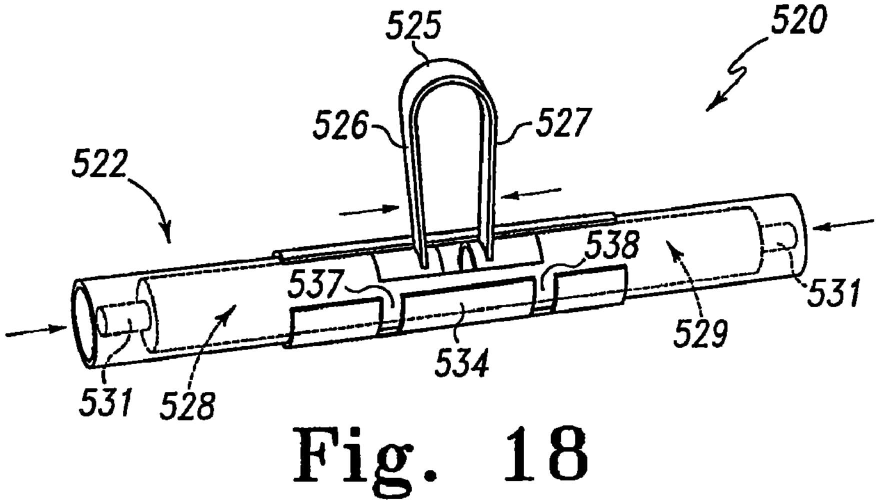
FIG. 18 is a perspective view of the embodiment of the adjustment mechanism in FIG. 17 illustrating operation while unlocked.

Operation of this embodiment of the locking adjustment mechanism 520 is accomplished by manual operation of the telescopic engagement mechanism 525 and sleeve 534. Preferably, the telescopic engagement mechanism 525 has a biasing force or is “spring-loaded”, biasing the movement of the moveable link members or arms 526, 527 and pin members 528, 529 outward from the centerline or central axis 550 of telescopic engagement mechanism 525. To this end, as shown in FIGS. 16 and 17, to unlock the locking adjustment mechanism 520, a user rotates the sleeve 534 circumferentially about the housing 522 so the third portions 544, 548 of the first and second segment locking portions or first and second receptors 535, 536 move away from the first and second movable link members or first and second arms 526, 527. The first movable link member or first arm 526 passes through the first segment locking portion or first passage 545 of first receptor 535. The second movable link member or second arm 527 passes through the second segment locking portion or second passage 549 of second receptor 536. Once the sleeve 534 rotates so the first and second movable link members or first and second arms 526, 527 completely pass through the first and second passages 545, 549, the locking adjustment mechanism 520 is in the unlocked position. As shown in FIG. 18, a user can apply pressure to the telescopic engagement mechanism 525 to overcome the biasing force, for example squeezing the first and second movable link members or arms 526, 527 such that they move toward each other. The movement of the movable link members or arms 526, 527 translates into movement of the first and second pin members 528, 529 toward the centerline or central axis 550 of telescopic engagement mechanism 525, disengaging the pins 531 from corresponding pin receiving sites or apertures. At a maximum compression position of the telescopic engagement mechanism 525, the pins 531 may be received completely within the housing 522. Once disengaged, which may occur prior to the maximum position, the user can move the locking adjustment mechanism 520 to different pin receiving sites or apertures. Once repositioned, release of the telescopic engagement mechanism 525 allows the biasing force to move the first and second pin members 528, 529 away from the telescopic engagement mechanism 525, causing the pins 531 to be removably received by the different pin receiving sites or apertures.

Though engaged with pin receiving sites or apertures, the locking adjustment mechanism 520 remains unlocked, allowing the operation of the telescopic engagement mechanism 525 with one hand. In order to protect against accidental disengagement of the pins 531 from their corresponding pin receiving sites or apertures, the locking adjustment mechanism 520 can be returned to its locked state by rotating the sleeve 534 circumferentially about the housing 522 so the third portions 544, 548 of the first and second segment locking portions or first and second receptors 535, 536 move toward the first and second movable link members or first and second arms 526, 527. The first movable link member or first arm 526 passes through the first passage 545 of first segment locking portion or first receptor 535. The second movable link member or second arm 527 passes through the second passage 549 of second segment locking portion or second receptor 536. Once the sleeve 534 rotates so the first and second movable link members or first and second arms 526, 527 completely pass through the first and second passages 545, 549 and are in contact with the third portions 544, 548, the locking adjustment mechanism 520 is in the locked position. The first portion 542 and second portion 543 of the first segment locking portion or first receptor 535 physically restrict the movement of the first movable link member or first arm 526 and the first portion 546 and second portion 547 of the second segment locking portion or second receptor 536 physically restrict the movement of the second movable link member or second arm 527.

An alternative height adjustment mechanism 302 for use with the present invention can be see in FIG. 1B. This mechanism comprises one or more support legs 304 pivotally attached on a first end 306 to the first end 26 of the lower leg support frame 25. The second end 308 of the support leg 304 is attached either pivotally or in fixed position to a perpendicular support bar 310. Along at least a portion of the base 12, and preferably near the lower leg end 13 of the base 12, one or more support retaining devices 312 are provided. In the preferred embodiment, two support retaining devices 312 are attached in corresponding locations on opposite sides 240 and 242 of the base 12. Each support retaining device comprises a plurality of peaks 314 and at least one valley 316, but preferably a plurality of valleys 316. Each valley 316 is provided between two peaks 314. As a result, the support bar 310 of the mechanism 302 is received within a valley 316 and retained in position. The lower leg support frame 25 is therefore maintained at a distance above the base 12. To adjust the vertical position of the lower leg support frame 25 above the base 12, the support legs 304 and/or support bar 310 may be raised and inserted into a different valley 316.

Figure 9:
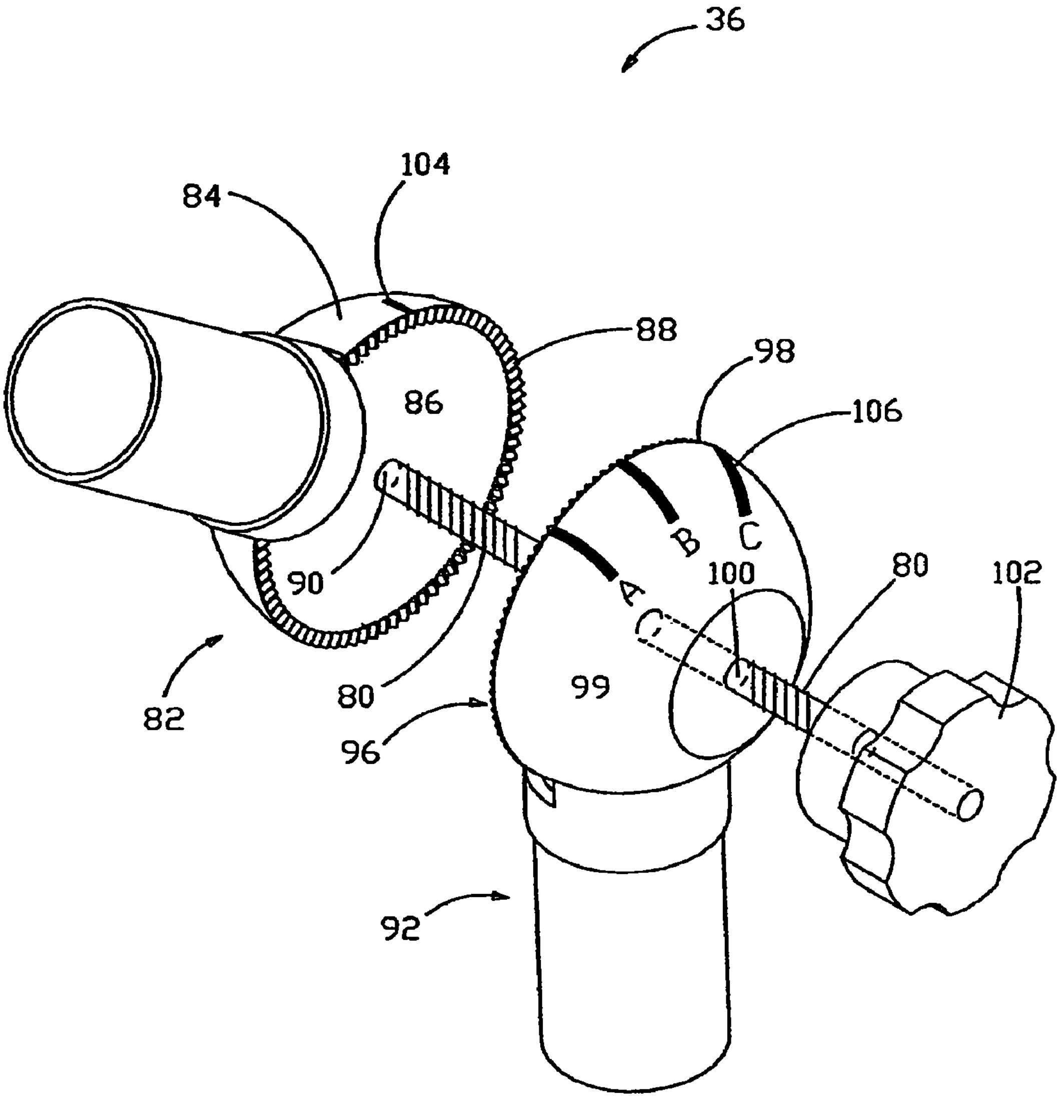
FIG. 9 is an exploded view of a ball-ratchet mechanism.

Turning now to FIG. 9, the ball-ratchet mechanism 36 is shown in an exploded, detailed view. The angle adjustment mechanism 30 of the leg elevator 11 includes at least one ball-ratchet mechanism 36 as shown in FIG. 9. In the preferred embodiment, the angle adjustment mechanism 30 includes a first ball-ratchet mechanism 45 and a second ball-ratchet mechanism 46. Each ball-ratchet mechanism is formed in the manner detailed below.

A ball-ratchet mechanism 36 of the preferred embodiment includes an elongated threaded connector 80, a first grooved member 82, a second grooved member 92 and a knob 102. The first grooved member 82 has an outer side 84 and an inner side 86. The first grooved member 82 also has a first plurality of grooves 88 formed on the inner side 86 of the first grooved member 82. A first threaded opening 90 originates at the inner side 86 of the first grooved member 82 and extends through the first grooved member 82. The first threaded opening 90 receives the elongated threaded connector 80. The second grooved member 92 has an outer side 94 and an inner side 96 (indicated by an arrow, but not shown). The second grooved member 92 also has a second plurality of grooves 98 formed on the inner side 96 of the second grooved member 92. The second plurality of grooves 98 is adapted to engage the first plurality of grooves 88. A second threaded opening 100 originates at the outer side 94 of the second grooved member 92 and extends through the second grooved member 92 to the inner side 96 of the second grooved member 92. The second threaded opening 100 receives the elongated threaded connector 80. The knob 102 is attached to the elongated threaded connector 80 for rotating the elongated threaded connector 80 as the elongated threaded connector 80 engages the first threaded opening 90 and the second threaded opening 100. The knob 102 is used to move the elongated threaded connector 80 between a locking position where the first plurality of grooves 88 and the second plurality of grooves 98 are held in engagement with each other and an unlocked position where the first plurality of grooves 88 and the second plurality of grooves 98 can be angularly adjusted with respect to each other.

While the preferred embodiment utilizes a ball-ratchet mechanism 36 for the angle adjustment mechanism 30, other mechanisms such as a hinge, a rotatable T-connector that is secured by a pin, or a clamping device could be utilized in the leg elevator 11 of the present invention. The ball-ratchet mechanism 36 is preferable, though, because it can be adjusted without requiring the patient to remove his or her leg from the leg elevator 11, and adjustment of the angle adjustment mechanism 30 can be performed by the patient without additional assistance. Furthermore, using the ball-ratchet mechanism, the relative angle of the upper leg platform 28 and lower leg support 15 can be adjusted without varying the height adjustment mechanism 16 or the upper leg adjustment mechanism 22 of the leg elevator 11 due to the independence of the angle adjustment mechanism 30 relative to the height adjustment mechanism 16 and the upper leg adjustment mechanism 22. The ball-ratchet mechanism 36 is also preferred due to the ease it provides in varying the position of the elevator and in reproducing a preferred or physician specified angular orientation of the upper leg platform 28 to the lower leg platform 29. Alternatively, the patient can simply adjust the leg elevator 11 to position the leg in any manner that is comfortable to the patient. To further aid in achieving a desired position of the angle adjustment mechanism 30, a ball-ratchet mechanism 36 preferably includes a plurality of markings 104 on the outer side 84 of the first grooved member 82 and a plurality of markings 106 on the outer side 94 of the second grooved member 92. The plurality of markings 106 on the outer side 94 of the second grooved member 92 can be adapted to align with the plurality of markings 104 on the outer side 84 of the first grooved member 82.

To adjust a ball-ratchet mechanism 36 as shown in FIG. 9, the knob 102 is turned such that the elongated threaded connector 80, which is threadably engaged with the first grooved member 82 via the first threaded opening 90 and with the second grooved member 92 via the second threaded opening 100, moves away from the first grooved member 82. Turning the knob 102 as described will cause the first plurality of grooves 88 on the inner side 86 of the first grooved member 82 and the second plurality of grooves 98 on the inner side 96 of the second grooved member 92 to disengage. This is the unlocked position. While in the unlocked position, the first grooved member 82 can be twisted relative to the second grooved member 92, thereby adjusting the relative angle of the upper leg platform 28 and the lower leg platform 29. When the desired angle has been achieved, the knob 102 is turned in the opposite direction, causing the elongated threaded connector 80 to re-engage the first threaded opening 90 in the first grooved member 82. Turning the elongated threaded connector 80 as described will bring the first grooved member 82 closer in proximity to the second grooved member 92 such that by turning the knob 102, the first plurality of grooves 88 will be held in engagement with the second plurality of grooves 98, and the angle adjustment mechanism 30 will be held in a stable position.

The preferred embodiment of the leg elevator 11 is comprised of lightweight plastic tubing such as PVC (polyvinyl chloride) pipe. Using PVC pipe to manufacture the leg elevator 11 of the preferred embodiment creates a leg elevator 11 that is relatively inexpensive and easy to manufacture, which allows the device to be affordable for use in a home setting. However, other material could be used to construct the leg elevator 11. For example, lightweight aluminum could be substituted for the PVC pipe without altering the material features of the present invention. Additionally, the lightweight plastic parts of the telescopic leg 35 of the leg elevator 11 can be formed of round tubing or alternatively, of square or octagonal-shaped pieces. Preferably, the materials selected and used in the preferred embodiment, including the plastic tubing and aluminum described above, comprise readily available materials that are easily obtainable "over-the-counter", inexpensive, and easily replaceable.

In addition to the use of tubing, such as lightweight plastic tubing described herein, the frame elements of the leg elevator may be further strengthened by the addition of a reinforcing material to one or more frame elements and/or the plastic tubing (See FIG. 1A). Preferably, a second smaller diameter plastic or metal (for instance, aluminum) tube or rod 222 may be inserted within one or more of the various frame elements of the leg elevator system 11 in any location. As a result, the leg elevator will be provided with enhanced stability and durability.

Many modifications and variations of the present invention are possible in light of the above teachings. For example, although the preferred embodiment utilizes a base 12 and support platforms 28, 29 which are adapted to be wide enough to support one leg at a time, the leg elevator 11 could be adapted such that the leg elevator 11 is wide enough to accommodate the support of both legs at one time. Therefore, within the scope of the appended claims, the present invention may be practiced otherwise than as specifically described, and the present invention has been described in an illustrative manner only. It is to be understood that the terminology that has been used is intended to be in the nature of words description rather than of limitation. It will be understood by those skilled in the art the various changes and modifications can be made about departing from the scope of the invention as defined in the appended claims.

While this invention has been described in conjunction with the exemplary embodiments outlines above, various alternatives, modifications, variations, improvements and/or substantial equivalents, whether known or that are or may be presently foreseen, may become apparent to those having at least ordinary skill in the art. Accordingly, the exemplary embodiments of the invention, as set forth above, are intended to be illustrative, not limiting. Various changes may be made without departing from the spirit or scope of the invention. Therefore, the invention is intended to embrace all known or later developed alternatives, modifications, variations, improvements, and/or substantial equivalents.

What is claimed is:

1. An adjustment assembly comprising:

a housing comprising:

a first end and a second end, a housing aperture, a clearance aperture having a left portion, a right portion and an opening there between, and a locking aperture having a left segment portion in communication with the clearance aperture and a right segment portion in communication with the clearance aperture;

a first pin member telescopically received within the first end of the housing;

a second pin member telescopically received within the second end of the housing;

a telescopic engagement assembly having a first arm and a second arm, the first arm connected to the first pin member, and the second arm connected to the second pin member;

the telescopic engagement assembly mounted in the clearance aperture and adapted to telescopically actuate the first and second pin members;

a spring button received within the housing and rotatably associated with the telescopic engagement assembly; and the telescopic engagement assembly rotatable from the clearance aperture to the locking aperture and concurrently enabling the spring button to engage the housing aperture to lock the first and second pin members in a rigid position.

2. The adjustment assembly of claim 1, wherein the left segment portion includes a first portion and a second portion separated by a third portion and a first passage connecting the left segment portion to the clearance aperture; and the right segment portion includes a first portion and a second portion separated by a third portion and a second passage connecting the right segment locking portion to the clearance aperture.

3. The adjustment assembly of claim 1, wherein the spring button is connected to the first pin member to enable the spring button to rotate and telescope with the first pin member.

4. A locking adjustment assembly comprising:

a housing having a first end, a second end, a clearance aperture in communication with a locking aperture, and a housing aperture;

a first pin member telescopically received within the first end of the housing;

a second pin member telescopically received within the second end of the housing;

a telescopic engagement assembly mounted in the clearance aperture, the telescopic engagement assembly having a first arm adapted to telescopically and rotatably move the first pin member and a second arm adapted to telescopically and rotatably move the second pin member;

a locking assembly received within the housing and in telescopic and rotatable communication with the first pin member, the locking assembly having a locking member connected to a biasing member;

the telescopic engagement assembly rotatable between the clearance aperture and the locking aperture, the locking aperture resisting telescopic movement of the telescopic engagement assembly, the telescopic engagement assembly further adapted to rotate the locking assembly and enable the housing aperture to receive the locking member when the telescopic engagement assembly is positioned in the locking aperture.

5. The adjustment assembly of claim 4, wherein the clearance aperture is connected to the locking aperture by a passage.

6. The adjustment assembly of claim 4, wherein the locking aperture further comprises:

a first segment locking portion having a first portion and a second portion separated by a third portion and a first passage connecting the first segment locking portion to the clearance aperture;

a second segment locking portion having a first portion and a second portion separated by a third portion and a second passage connecting the second segment locking portion to the clearance aperture;

the first segment locking portion adapted to receive the first arm of the telescopic engagement assembly; and the second segment locking portion adapted to receive the second arm of the telescopic engagement assembly.

7. The adjustment assembly of claim 4, wherein the locking assembly is a spring button.

8. The adjustment assembly of claim 4, wherein the telescopic engagement assembly has a bias toward the first and second ends of the housing.

9. The adjustment assembly of claim 4, wherein the housing is a hollow cylindrical member.

10. An adjustment mechanism comprising:

a housing having a first end, a second end, a clearance portion in communication with a locking portion, and a housing aperture, the locking portion formed by a slot adjacent the clearance portion;

a first pin member telescopically received within the first end of the housing;

a second pin member telescopically received within the second end of the housing;

a telescopic engagement mechanism mounted in the clearance portion, having a first arm and a second arm, the first arm adapted to telescopically move the first pin member, and the second arm adapted to telescopically move the second pin member;

the telescopic engagement mechanism rotatable between the clearance portion and the locking portion of the housing, said locking portion resisting telescopic movement of the arms;

a locking mechanism received within the housing and adapted to rotate with the telescopic engagement mechanism, and engage the housing aperture when the telescopic engagement mechanism is rotated to the locking portion of the housing.

11. The adjustment mechanism of claim 10, wherein the locking portion further comprises a left segment for receiving the first arm of the telescopic engagement mechanism and a right segment for receiving the second arm of the telescopic engagement mechanism.

12. The adjustment mechanism of claim 10, wherein the telescopic engagement mechanism includes a biasing means to bias the first arm toward the first end of the housing and the second arm toward the second end of the housing.

13. The adjustment mechanism of claim 10, wherein the locking mechanism further comprises:

a spring button having a button and a biasing member, the biasing member having a biasing force extending radially outward from the biasing member toward the housing.

14. The adjustment mechanism of claim 13, wherein the locking portion further comprises a left segment and a right segment contacting the telescopic engagement mechanism.

15. The adjustment mechanism of claim 13, wherein the clearance portion further comprises a left portion, a right portion, and an opening to move the telescopic engagement mechanism and reposition the pin members.

16. The adjustment mechanism of claim 10, wherein the first and second pin member further comprises a telescoping member having a pin mounted on an end and adapted so the telescopic engagement mechanism arm telescopically moves the telescoping member.

17. The adjustment mechanism of claim 10, wherein the housing is a substantially hollow cylindrical member.

18. The adjustment mechanism of claim 10, wherein the telescopic engagement mechanism forms an external spring.

19. The adjustment mechanism of claim 1, further comprising a stop positioned on the telescopic engagement mechanism.

* * * * *